United States Patent
Garcia

(10) Patent No.: US 11,521,261 B2
(45) Date of Patent: Dec. 6, 2022

(54) SYSTEM, METHOD, AND MACHINE-READABLE STORAGE MEDIUM FOR AN ARTIST TOUR GENERATION

(71) Applicant: eBay Inc., San Jose, CA (US)

(72) Inventor: Edward O'Neil Garcia, San Jose, CA (US)

(73) Assignee: EBAY INC., San Jose, CA (US)

( * ) Notice: Subject to any disclaimer, the term of this patent is extended or adjusted under 35 U.S.C. 154(b) by 114 days.

(21) Appl. No.: 16/673,290

(22) Filed: Nov. 4, 2019

(65) Prior Publication Data
US 2020/0065888 A1    Feb. 27, 2020

Related U.S. Application Data

(63) Continuation of application No. 14/319,832, filed on Jun. 30, 2014, now abandoned.

(60) Provisional application No. 61/994,044, filed on May 15, 2014.

(51) Int. Cl.
*G06Q 30/00*    (2012.01)
*G06Q 30/06*    (2012.01)

(52) U.S. Cl.
CPC ............... *G06Q 30/0641* (2013.01)

(58) Field of Classification Search
CPC ................................. G06Q 30/0641
USPC ....................................... 705/27.1
See application file for complete search history.

(56) References Cited

U.S. PATENT DOCUMENTS

| | | | | |
|---|---|---|---|---|
| 8,463,629 B2* | 6/2013 | Neulight | ............... | G06Q 10/02 705/5 |
| 8,817,969 B1* | 8/2014 | Chou | .................. | H04M 3/5166 379/266.07 |
| 9,449,288 B2* | 9/2016 | Swann | .................. | G06F 16/355 |
| 2007/0027794 A1* | 2/2007 | Brett | ...................... | G06Q 10/02 705/37 |

(Continued)

FOREIGN PATENT DOCUMENTS

WO    2015175829 A1    11/2015

OTHER PUBLICATIONS

Deichmann, J. I. (2014). Analysis of U2's Concert Performance Location Choice: Application of an Adapted Gravity Model. International Journal of Arts & Sciences, 7(4), 307-320. Retrieved from https://search.proquest.com/docview/1644513247?accountid=14753 (Year: 2014).*

(Continued)

*Primary Examiner* — Michelle T Kringen
*Assistant Examiner* — Arielle E Weiner
(74) *Attorney, Agent, or Firm* — Schwegman Lundberg & Woessner, P.A.

(57) ABSTRACT

Systems, computer-implemented methods, and computer-readable storage mediums for determining tour locations are disclosed. Users are provided access to items of an online marketplace of a first user. Data is received from the first user that includes a request to determine a tour location of a tour. User accesses to the items of the online marketplace are monitored. Based at least on the monitored user accesses, values for candidate locations are determined. One of the candidate locations is selected based at least on the determined values of the candidate locations. The selected location of the candidate locations may be provided to the first user.

15 Claims, 12 Drawing Sheets

(56) References Cited

U.S. PATENT DOCUMENTS

| | | | | |
|---|---|---|---|---|
| 2007/0245351 | A1* | 10/2007 | Sussman | H04L 67/1008 718/104 |
| 2008/0046298 | A1* | 2/2008 | Ben-Yehuda | G06Q 10/109 705/6 |
| 2008/0097826 | A1 | 4/2008 | Leach et al. | |
| 2010/0268556 | A1 | 10/2010 | Booth, Jr. | |
| 2013/0046580 | A1* | 2/2013 | Harker | G06Q 10/00 705/7.31 |
| 2013/0073324 | A1* | 3/2013 | Liu | G06Q 10/02 705/5 |
| 2013/0332231 | A1 | 12/2013 | Pickton et al. | |
| 2014/0019173 | A1 | 1/2014 | Spindler | |
| 2014/0049564 | A1 | 2/2014 | Borger et al. | |
| 2014/0188911 | A1* | 7/2014 | Skeen | G06F 16/639 707/754 |
| 2015/0332384 | A1 | 11/2015 | Garcia | |

OTHER PUBLICATIONS

Advisory Action received for U.S. Appl. No. 14/319,832, dated Jun. 27, 2018, 3 pages.

Applicant Initiated Interview Summary Received for U.S. Appl. No. 14/319,832 dated Jul. 31, 2019, 2 pages.

Applicant Initiated Interview Summary received for U.S. Appl. No. 14/319,832, dated Jun. 6, 2018, 3 pages.

Final Office Action received for U.S. Appl. No. 14/319,832, dated May 29, 2019, 25 pages.

Final Office Action received for U.S. Appl. No. 14/319,832, dated Apr. 20, 2018, 44 pages.

Non-Final Office Action received for U.S. Appl. No. 14/319,832, dated Jun. 28, 2017, 32 pages.

Non-Final Office Action received for U.S. Appl. No. 14/319,832, dated Oct. 4, 2018, 52 pages.

Notice of Non-Responsive Amendment Received for U.S. Appl. No. 14/319,832, dated Oct. 4, 2019, 8 pages.

Response to Advisory Action filed on Aug. 3, 2018, for U.S. Appl. No. 14/319,832, dated Jun. 27, 2018, 37 pages.

Response to Final Office Action filed on Jul. 29, 2019 for U.S. Appl. No. 14/319,832, dated May 29, 2019, 17 pages.

Response to Final Office Action filed on Jun. 18, 2018, for U.S. Appl. No. 14/319,832, dated Apr. 20, 2018, 37 pages.

Response to Non-Final Office Action filed on Dec. 28, 2017, for U.S. Appl. No. 14/319,832, dated Jun. 28, 2017, 36 pages.

Response to Non-Final Office Action filed on Feb. 4, 2019, for U.S. Appl. No. 14/319,832, dated Oct. 4, 2018, 31 pages.

Deichmann, "Analysis of U2's Concert Performance Location Choice: Application of an Adapted Gravity Model", Retrieved from https://search.proquest.com/docview/1644513247?accountid=14753, 2014, pp. 307-320.

International Preliminary Report on Patentability received for PCT Application No. PCT/US2015/030882, dated Nov. 15, 2016, 8 pages.

International Search Report received for PCT Application No. PCT/US2015/030882, dated Aug. 14, 2015, 2 pages.

Written Opinion received for PCT Application No. PCT/US2015/030882, dated Aug. 14, 2015, 7 pages.

* cited by examiner

SYSTEM, METHOD, AND MACHINE-READABLE STORAGE MEDIUM FOR AN ARTIST TOUR GENERATION

PRIORITY CLAIM UNDER 35 USC 119(e)

The present application is a continuation of U.S. application Ser. No. 14/319,832, filed Jun. 30, 2014, which claims the benefit of priority under 35 U.S.C. 119(e) of U.S. Provisional Patent Application Ser. No. 61/994,044, filed May 15, 2014, each of which is hereby incorporated by reference in its entirety.

TECHNICAL FIELD

Example embodiments of the present application generally relate to online marketplaces and, more particularly, to a system and method for facilitating user interactions.

BACKGROUND

Marketplaces can be online and/or real world (e.g., brick and mortar). Online marketplaces can include websites or mobile applications where users may buy or sell goods or services (referred to collectively as "items") from a provider of the online marketplace or other users of the online marketplace. The goods or services (referred to collectively as "items") are described in a published listing. Similar to online marketplaces, real-world online marketplaces may have websites that allows users to view inventory or interact with the real-world online marketplace.

Artists may provide media content by way of online markets. In particular, musicians, authors, filmmakers, actors, and the like may upload digital media content to an online marketplace for access other users, consumers, and fans. Additionally, consumers may purchase physical merchandise online.

BRIEF DESCRIPTION OF THE DRAWINGS

In the drawings, which are not necessarily drawn to scale, like numerals may describe similar components in different views. Like numerals having different letter or numeric suffixes may represent different instances of similar components. The drawings illustrate generally, by way of example, but not by way of limitation, various embodiments discussed in the present document.

DETAILED DESCRIPTION

Figure 1:
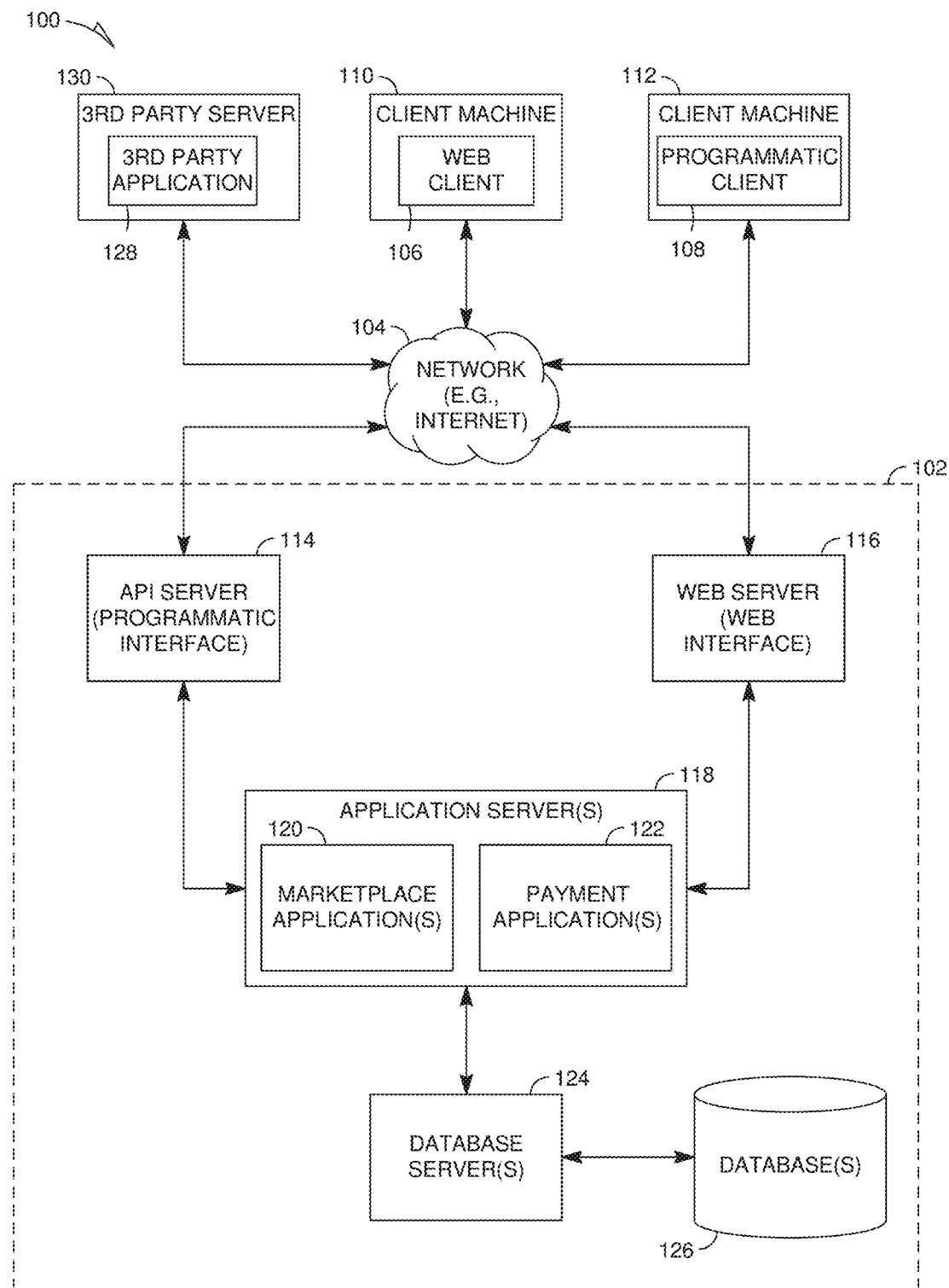
FIG. 1 is a network diagram depicting a client-server system, within which one example embodiment may be deployed.

Reference will now be made in detail to specific example embodiments for carrying out the inventive subject matter. Examples of these specific embodiments are illustrated in the accompanying drawings. It will be understood that they are not intended to limit the scope of the claims to the described embodiments. On the contrary, they are intended to cover alternatives, modifications, and equivalents as may be included within the spirit and scope of the disclosure as defined by the appended claims. In the following description, specific details are set forth in order to provide a thorough understanding of the subject matter. Embodiments may be practiced without some or all of these specific details. In addition, well known features may not have been described in detail to avoid unnecessarily obscuring the subject matter.

In accordance with the present disclosure, components, process steps, and/or data structures may be implemented using various types of operating systems, programming languages, computing platforms, computer programs, and/or general purpose machines. In addition, those of ordinary skill in the art will recognize that devices of a less general purpose or nature, such as hardwired devices, field programmable gate arrays (FPGAs), application specific integrated circuits (ASICs), or the like, may also be used without departing from the scope and spirit of the concepts disclosed herein. Embodiments may also be tangibly embodied as a set of computer instructions stored on a computer readable medium, such as a memory device.

Example methods and systems for determining tour locations based on fan-artist interactions are described. In the following description, for purposes of explanation, numerous specific details are set forth in order to provide a thorough understanding of example embodiments. It will be evident, however, to one skilled in the art that the present invention may be practiced without these specific details.

Media content may be accessed (e.g., viewed or purchased) through a variety of digital means. Internet-based radio stations, for example, may provide audio content from a variety of musicians and radio personalities. In some cases, the online radio stations may be free to the consumers and may provide some on-demand functionality. Other types of media content may include books, podcasts, television shows, movies, visual art (e.g., paintings, photographs, etc.), and the like. Increasingly, consumers are accessing media content from these online, and sometimes free, sources. At the same time, there has been a proliferation of new artists due to the low start-up costs that these digital sources provide. As a result, selling media content may be less profitable. Moreover, because of the large amount of media content available to consumers, these consumers may become overwhelmed by choices, and artists may find it difficult to gain the attention of consumers and to create relationships with their fans.

Systems and methods described herein provide online marketplaces that facilitate artist-fan interactions, for example, by determining one or more stops of a tour that is being planned. Increased artist-fan interactions as described herein may provide the artist with an opportunity to generate additional revenue, as well as improve the connection of the fans with the artist.

An online marketplace may provide media content from a plurality of content creators/providers ("artists"). An online marketplace may be a website, desktop application, mobile application, or other client-server application through which a user (e.g., "buyer," "consumer," or "fan") may be provided details and new regarding the artist, access media content from the artist, as well as purchase merchandise or services (referred to collectively as "items"). The online marketplace may form part of an online marketplace application that provides access to a plurality of individual online marketplaces. For example, the online marketplace application may include individual online marketplaces for a plurality of bands, each individual online marketplace providing items of the artist. As used herein, the term "online marketplace" may refer to the individual online marketplace or the online marketplace application that provides one or more individual online marketplaces. As used herein, the term "accessing an item" may include downloading or streaming media content, purchasing media content, purchasing merchandise, sharing artist information with other contacts, subscribing to receive further information from the artist, and/or the like.

The items of the online marketplace may be provided in a published listing. The listing may indicate various properties or characteristics of the media content, good, service, or proposed transaction. The online marketplace may publish the listing in a view item page or another webpage. In example embodiments, the view item page includes the description of the item and a number of options that can be selected by the user viewing the page. The options may include an option to purchase or bid on the item, an option to watch the item, an option to send a link to the listing in an electronic message (e.g., email, text message, private message within a social network), or to share a link to the listing via a social network. Social networks include, but are not limited to TWITTER™, FACEBOOK™, LINKEDIN™, PINTEREST™, meet-up sites, dating sites, and other sites where users can post content or replies to content.

As stated, the online marketplace may facilitate artist-fan interaction. For example, an artist having an associated online marketplace may initiate a tour campaign that will be implemented by the online marketplace. During the tour campaign, users of the online market may take part in, either directly or indirectly, selecting or "unlock" one or more tour stops. One way in which users may influence the selection of the tour stops is through the users' interactions with the online marketplace of the artist. For example, via the artist's online marketplace, users may download media content, purchase media content, subscribe or follow the artist, share the artist to their contacts, and/or pre-order tickets, among other actions, each of which may earn a certain amount of points. Additional, fans may perform activities to help promote the band in order to unlock a tour location. Accordingly, disclosed embodiments may create a "viral" social networking component that may increase the exposure of the band.

The points generated by users may be aggregated by candidate tour stops—e.g., the points produced by users living near a city may be combined to form the score of the city. In one embodiment, the cities having the top scores may be selected to become tour stops. Additionally or alternatively, each city, possibly up to a limited number of cities that exceeds a threshold may be selected to be tour stops.

FIG. 1 is a network diagram depicting a client-server system 100, within which one example embodiment may be deployed. A networked system 102, in the example forms a network-based online marketplace or publication system, provides server-side functionality, via a network 104 (e.g., the Internet or Wide Area Network (WAN)) to one or more clients. FIG. 1 illustrates, for example, a web client 106 (e.g., a browser), and a programmatic client 108 executing on respective client machines/devices 110 and 112.

An Application Program Interface (API) server 114 and a web server 116 are coupled to, and provide programmatic and web interfaces respectively to, one or more application servers 118. The application servers 118 host one or more online marketplace applications 120, and payment applications 122. The application servers 118 are, in turn, shown to be coupled to one or more databases servers 124 that facilitate access to one or more databases 126.

The online marketplace applications 120 may provide a number of online marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for items that are made available via the online marketplace applications 120.

Further, while the system 100 shown in FIG. 1 employs a client-server architecture, the present invention is of course not limited to such an architecture, and could equally well find application in a distributed, or peer-to-peer, architecture system, for example. The various online marketplace and payment applications 120, 122 could also be implemented as standalone software programs, which do not necessarily have networking capabilities.

In addition, while the various online marketplace and payment applications 120, 122 have been described above as having separate functionalities, in alternative embodiments these functionalities may be performed by any one or more of the various online marketplace and payment applications 120, 122.

The web client 106 accesses the various online marketplace and payment applications 120 and 122 via the web interface supported by the web server 116. Similarly, the programmatic client 108 accesses the various services and functions provided by the online marketplace and payment applications 120 and 122 via the programmatic interface provided by the API server 114. The programmatic client 108 may, for example, be a seller application (e.g., the TURBOLISTER™ application developed by EBAY INC.™, of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, online marketplace, or payment functions that are supported by the relevant applications of the networked system 102.

Figure 2:
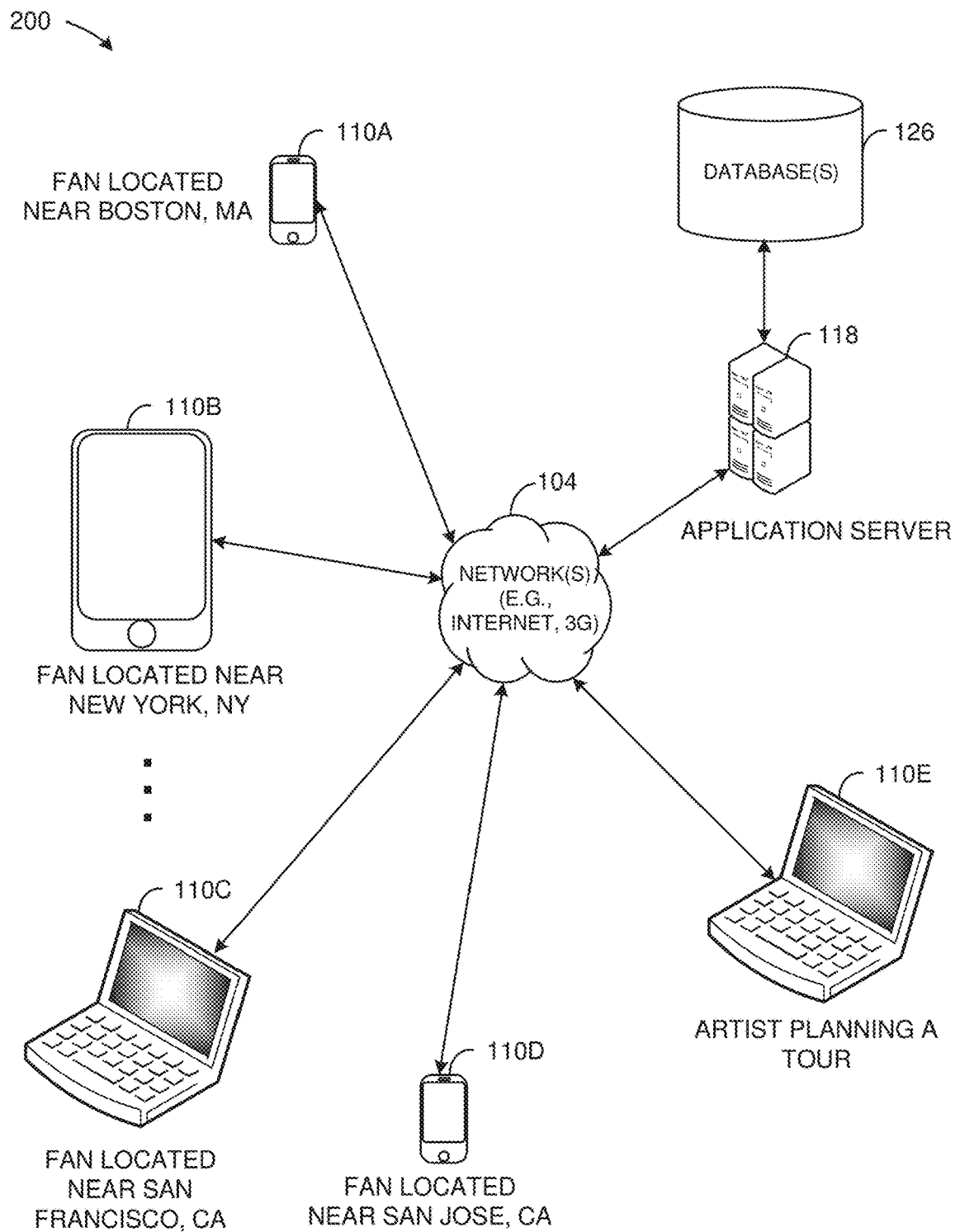
FIG. 2 is schematic diagram illustrating an example embodiment of an artist online marketplace network including multiple networked devices forming at least a portion of the client-server system of FIG. 1.

FIG. 2 is schematic diagram illustrating an example embodiment of an artist online marketplace network 200 including multiple networked user devices 110A-110E forming at least a portion of the client-server system of FIG. 1. Elements common to FIGS. 1 and 2 share common reference indicia, and only differences between the Figures are described herein for the sake of brevity. In particular, the user devices 110A-110E correspond to the client machine 110 of FIG. 1 and are interconnected by the network 104 and are communicatively coupled to the application server 126 and the database(s) 126.

As illustrated, the user devices 110A-110E may each correspond to a desktop computer, a laptop computer, tablet computer, a mobile phone, or another type of device capable of communicating with the network 104 and/or the application server 118. By way of example, the user devices 110A-110D, in particular, may correspond to the user devices of users who are content consumers, viewers, buyers, and/or the like (collectively referred to as "fans"). Moreover, the user device 110E may correspond to the device of a user who is a content producer, seller, and/or the like (collectively referred to as an "artist"). It will be appreciated, however, that user devices 110A-110E are referred to as either fans or artists by way of example, and that each of the client devices 110A-110E may correspond to an artist and/or a fan, in accordance with various use cases of embodiments. Accordingly, as used herein, artists and fans may each be referred to as users.

The artist may have a corresponding online marketplace providing access to one or more items, as well as additional information related to the artist. Examples of items may include digital media content, physical merchandise, and/or event tickets and bookings. Items may also include graphical user interface objects that allow users to share, like, and/or follow the online marketplace. Digital media content may include, for example, music, audio recordings, books, novels, graphic novels, podcasts, television shows, movies, visual arts (e.g., paintings, photographs, etc.), and the like. Merchandise may include, for example, clothing, posters, memorabilia and collectable items, stickers, autographed items, and the like. As such, examples of artists include graphic designers, musicians, music producers, authors, comic book writers and/or artists, filmmakers, actors, celebrities, chefs, athletes, and the like. However, it will be appreciated by a person of ordinary skill that artists can be any user who provides media content and/or merchandise to the artist's online marketplace. It will also be appreciated by a person of ordinary skill that access may be given to the items based on a purchase-based and/or an advertisement-based transactional model.

In one example aspect, the artist may initiate a campaign to plan a tour, wherein one or more locations of the tour may be determined by the actions of the fans. A campaign, as used herein, refers to a process for selecting locations of a tour, wherein the fans may participate in the selection process. As will be described below in greater detail, fans may influence the selection process in one or more ways, including accessing items of the marketplace of the artist. As stated, examples of accessing an item may include downloading or streaming media content, purchasing media content, purchasing merchandise, sharing artist information with other contacts, and/or the like.

Accordingly, the application server 118 may store and maintain data related to one or more online marketplaces by way of the database 126. In particular, the application server 118 may receive and transmit online marketplace data to and from the user devices 110A-110E. In one example, the user devices 110A-110E may implement a client-side application for displaying a user interface of the online marketplaces to the users. These client-side applications may retrieve data related to the online marketplaces from the application server 118. For example, the data related to the online marketplaces may be stored in the database 126. In an alternative example, the online marketplaces may be provided as one or more webpages. As such, the application server 118 may retrieve data related to the webpages from the database 126 provide the webpages to the client devices for display.

The user device 110E of the artist may transmit data related to the artist's online marketplace to the application server 118. The data may correspond to artist information, graphics and images, media content, merchandise, a schedule of events, and the like. Additionally, the user device 110E may transmit data related to a campaign to the application server 118. The campaign data may include a request to initiate a campaign, such as a process to determine a tour location. In turn, the application server 118 may update the online marketplace of the artist to include information regarding the online marketplace and/or the campaign.

Users may interact with the one or more online marketplaces via the user devices. For example, the fans may access items provided by the artist's online marketplace. If there is an ongoing campaign, the fans' accessing of the items of the online marketplace may influence the outcome of the tour location selection process.

In operation, the application server 118 may assign values (or "points") for accessing items of the online marketplace. For example, the application server may assign a predetermined amount of points for particular types of accesses. In particular, downloading or streaming media content, purchasing media content, purchasing merchandise, sharing artists information with other contacts, and the like may each be assigned a certain amount of points. Furthermore, the application server 118 may combine points by location in order to score and rank candidate locations for the tour. For example, the points generated by users having a locale associated with Boston can be combined to generate a score for Boston. In the illustrated embodiment, scores can be generated likewise for the cities of New York, San Francisco, and San Jose, among others. Accordingly, cities may be ranked according to the scores, and tour locations may be determined from the ranking. Although, as described herein, a user access is described as being assigned a number of "points" and that points from certain users can be combined to form a "score," it will be appreciated that in some embodiments points and scores refer to a quantitative numerical values.

As stated, the application server 118 may combine the points assigned in response to user accesses who have graphically-related locales. The locale of a user may include the user's residence, place of business, location in which the access occurred, and the like. Geographically related locales include locales sharing the same nearest city under consideration, such as a candidate location of the tour. Candidate locations may include cities having at least a predetermined population and being located within geographic constraints, if any, as specified by the artist. However, in one embodiment, the user may specify a list of cities to define the candidate locations under consideration of the campaign.

Additionally or alternatively, the artist may specify a threshold distance between candidate tour locations. Accordingly, the points generated by users of different cities may be combined together to generate a score for one candidate tour location. For example, the points generated by the users of the user devices 110C, 110D may be combined to form a score for the "Bay Area" candidate tour location, whereas the points generated by the users of user devices 110A, 110B may separately contribute to the scores of "Boston" and "New York," respectively. However, in some situations, the artist may specify a (minimum) threshold distance between candidate locations such that the points generated by the users of the user devices 110A, 110B may be combined to form one score, for example, for the "Northeast, USA."

Furthermore, users of the artist online marketplace network 200 may be able to interact with the online marketplace(s) in a variety of ways. For instance, fans may be able to search and browse the one or more online marketplaces in order to find artists, media content, merchandise, and the like. Additionally, fans may share, watch, like, subscribe, and the like operations in order to follow, track, and/or promote artists. In particular, by providing these operations, the application server 118 may facilitate the fans' promoting and contributing to the progress of campaigns.

Figure 3:
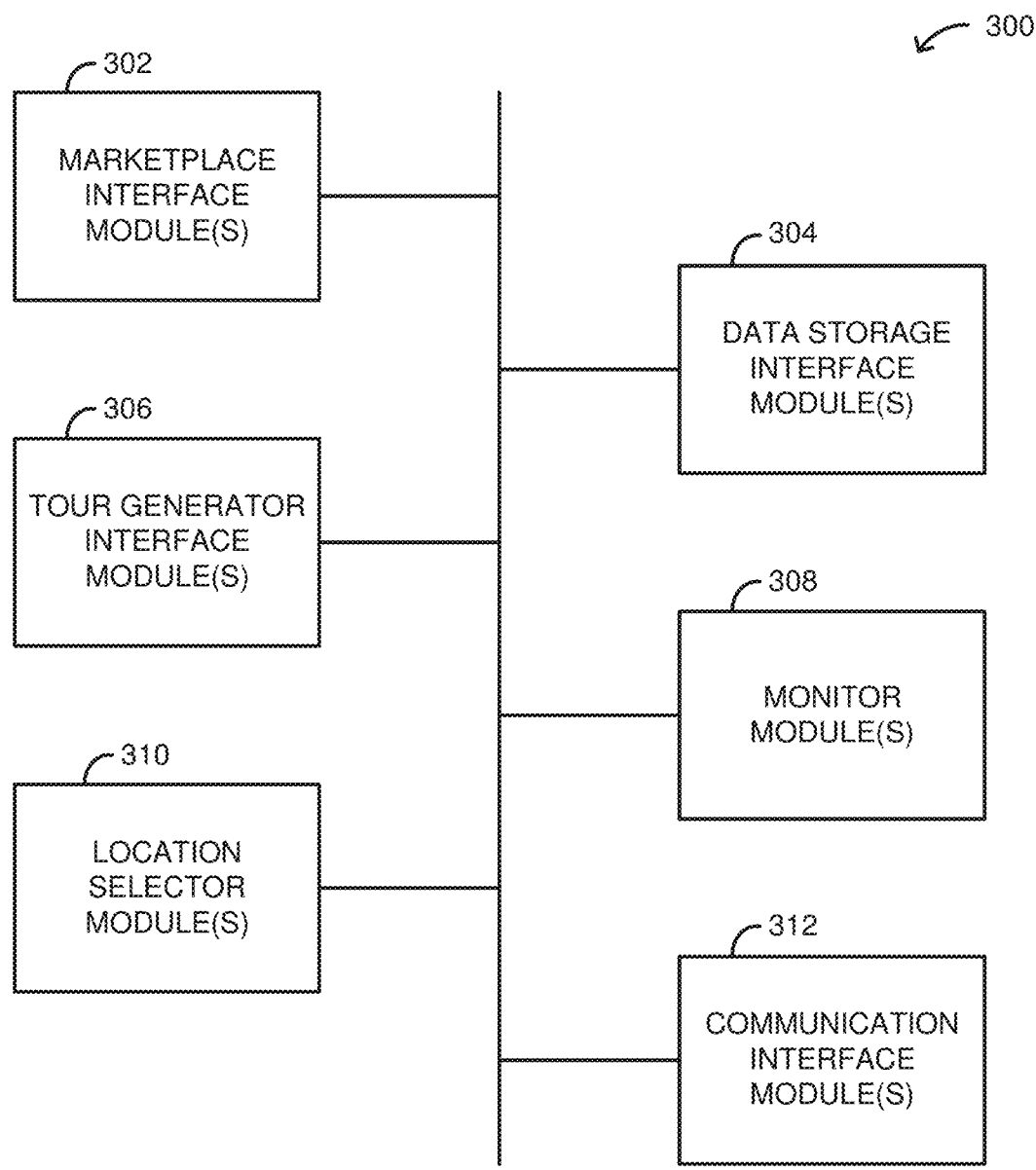
FIG. 3 is a block diagram illustrating an example embodiment of a tour generator system including multiple modules forming at least a portion of the client-server system of FIG. 1.

FIG. 3 is a block diagram illustrating an example embodiment of a tour generator system 300 including multiple modules 302-312 forming at least a portion of the client-server system 100 of FIG. 1. The modules 302-312 of the illustrated embodiment include an online marketplace interface module(s) 302, a data storage interface module(s) 304, a tour generator interface module(s) 306, a monitor module (s) 308, a location selector module(s) 310, and a communication interface modules(s) 312. In some embodiments, the components of the tour generator system 300 can be included by the online marketplace application 120 of FIG. 1. However, it will be appreciated that in alternative embodiments, one or more components of the tour generator system 300 described below can be included, additionally or alternatively, by other devices, such as one or more of the servers 114, 116, 118, 130, the network 104, and/or the client machines 110, 112 of FIG. 1.

Accordingly, the modules 302-312 of the tour generator system 300 may be hosted on dedicated or shared server machines that are communicatively coupled to enable communications between server machines. Each of the modules 302-312 is communicatively coupled (e.g., via appropriate interfaces) to each other and to various data sources, so as to allow information to be passed between the modules 302-312 or so as to allow the modules 302-312 to share and access common data. The various modules 302-312 may furthermore access one or more databases servers 124 that facilitate access to one or more databases 126.

The tour generator system 300 may facilitate artist-fan interactions. In one aspect, the artist may provide input to the tour generator that defines various aspects of a campaign to determine one or more locations of an upcoming tour. In turn, fans may interact with the online marketplace, including a profile page and a storefront of the artist. Accessing items of the online marketplace may affect the selection of the locations of the upcoming tour. For example, a city associated with a high number of fan activity (e.g., determined by the amount and types of user accesses) may be awarded a tour stop of the upcoming tour. Additionally or alternatively, some embodiments of the tour generator system 300 may award other types of rewards, such as, but is not limited to, exclusive content (e.g., a recording of one or more live songs of the out), question-and-answer session via a virtual chat room or a physical meet-up, merchandise, and the like rewards that may not correspond include a tour stop. In one embodiment, these types of rewards may be given to the users of a selected city or to particular users. For example, users of an honorable-mention placing city may be awarded a virtual online chat session, or a highly-ranked user may receive signed memorabilia from a tour stop of a selected candidate tour location.

To this end, the tour generator system 300 is shown to include the online marketplace interface module 302 operatively coupled to the data storage interface module 304, the tour generator interface 306, the monitor module 308, the location selector module 310, and the communication interface modules 312. The online marketplace interface module 302 may be a hardware-implemented module which may provide data to facilitate one or more online marketplaces. For example, the online marketplace interface module 302 may provide access to items of the online marketplaces of artists for display on user devices. The items may include one or more of media content (e.g., music, videos, books, etc.), event tickets (e.g., concert tickets), and/or merchandise. A user may access an item by downloading or streaming media content, purchasing media content, purchasing merchandise, sharing artist information with other contacts, subscribing to receive updates from the online marketplace, and/or the like. Access may be provided in accordance with a purchase transactional model and/or an advertisement-based transaction model. In addition, the online marketplaces may serve as a profile page for providing information regarding the artist, such as background, artistic vision, current news, images, and the like, displayed in accordance with a theme of the artist. The online marketplace interface module 302 will be described in greater detail later in connection with FIGS. 4A-4C.

The data storage interface module 304 may be a hardware-implemented module which may store data and provide access to the stored data. Data may be related to parameters, records, and progress of the campaign. Additionally, records of user activities may be recorded even outside the context of a campaign, in order to provide real-time data to artists regarding fan activities and trends. Embodiments of example data structures that may be stored and provided by the storage interface module 304 will be described in greater detail later in connection with FIG. 5.

The tour generator interface 306 may be a hardware-implemented module which may facilitate determining locations of a tour from one or more candidate tour location. For example, the tour generator interface 306 module may receive data from the artist via the online marketplace interface 302 as input. The data may be related to initializing or requesting the start of a campaign to use fan interactions to select the one or more tour locations. Further, based on the data received from the artist, the tour generator interface 306 may initialize the monitor and location selector modules 308, 310 to perform activities that facilitate the selection of the location of the tour, as will be described below.

As stated, the tour generator interface 306 may receive, from the client device of the artist, data including a request to determine a tour location of a tour. The data received from the artist may further include one or more thresholds, a start time, an end time, geographic parameters. An example of a threshold may correspond to a score of a candidate location in order to be selected as a tour location. The start time and the end time may correspond to the duration of the campaign, during which time user accesses may be monitored and used to determine the selected location. The geographic parameters may include data indicative of the candidate location to be considered for the campaign, such as geographic boundaries (e.g., North America) or a list of candidate tour locations. As another example, geometric parameters may include restrictions on the relationships between selected candidate locations, such as minimum distances between selected tour locations, number of selected candidate locations for one or more sub-regions (e.g., four locations for the Northeast, USA; three locations for the Southeast; etc.).

Additionally or alternatively, the data received from the artist may provide an indication of a specified number of tickets reserved for purchase by users that have locales matched to the selected candidate location. For example, if a candidate tour location is selected, then some amount of tickets (e.g., 30%) may be reserved for users of the online marketplace. In particular, users who have generated points for the selected location may be given an opportunity to purchase event tickets before other users. Furthermore, users may be offered an opportunity to purchase the event ticket in an order based on the scores generated for each of the users (for example, users may be offered to purchase tickets in descending order of points generated by the respective users).

The tour generator interface 306 may be configured to provide, responsive to the receiving of the data, notifications to one or more users. For example, the notification may provide an indication that a tour generation process has been initiated. Further, the tour generator interface 306 may be configured to provide indications to the users of the progress of the campaign or that the campaign has ended.

The monitor module 308 may be a hardware-implemented module which may be configured to monitor the user accesses to the items of the online marketplace. The user accesses include at least one of streaming media content, downloading media content, purchasing physical merchandise, sharing the online marketplace with one or more contacts, or pre-ordering a ticket for one of the candidate locations. For example, the monitor module 308 may monitor the user accesses by receiving a user request to access a selected item of the online marketplace. In response to receiving the user request, the monitor module 308 may determine a locale of the user of the user access. The monitor module 308 will be described in greater detail later in connection with FIG. 8.

The location selector module 310 may be a hardware-implemented module which may determine values for candidate locations based at least on the monitored user accesses. For example, the location selector module 310 may receive the monitored user accesses, including the associated locales, as inputs from the monitor module 308. Furthermore, the monitor module 308 may determine a score for one more candidate locations. Based on the determined scores, the location selector module 310 may select one of the candidate locations. For example, in one embodiment, the location selector module 310 may select a candidate location responsive to the score of the selected one of the candidate locations being greater than the threshold, or responsive to reaching the end time and based on determining a ranking of candidate locations.

The location selector module 310 may be configured to determine the values of the candidate locations matching the user accesses to respective candidate locations, computing the respective values of the user accesses, and combining the computed values of the user accesses matched to matching candidate locations. For example, the location selector module 310 may combine the points generated by users located in proximity to a city to form the score for the city.

Additionally or alternatively, the location selector module 310 may be configured to select the one of the candidate locations by at least determining selection parameters based on the data received from the artist, ranking the candidate tour locations based on the values of the candidate locations, and selecting, based on the ranking, the one of the candidate locations. For example, the location selector module 310 may select the top ten highest scoring cities to form a tour based on user input received from the artist at the onset of initializing the campaign. The location selector module 310 will be described in greater detail later in connection with FIGS. 9 and 10.

As stated, rewards may be provided to selected users. For example, the tour generator inter 306 may be configured generate a ranking of a plurality of users based on the points generated by the users. The tour generator interface 306 may provide a reward to at least a selected user of the plurality of users based on the ranking. To provide feedback, the tour generator interface 306 may provide the rankings, for display, to the users—e.g., as a leaderboard of users and/or cities.

The communication interface module 312 may be a hardware-implemented module which may facilitate the flow of the information, data, and/or signals between the modules 302-212. In addition, the communication interface module 312 can be configured to support communication of the tour generator system 300 between the servers and client machines of FIG. 1.

Example User Interfaces

Figure 4A:
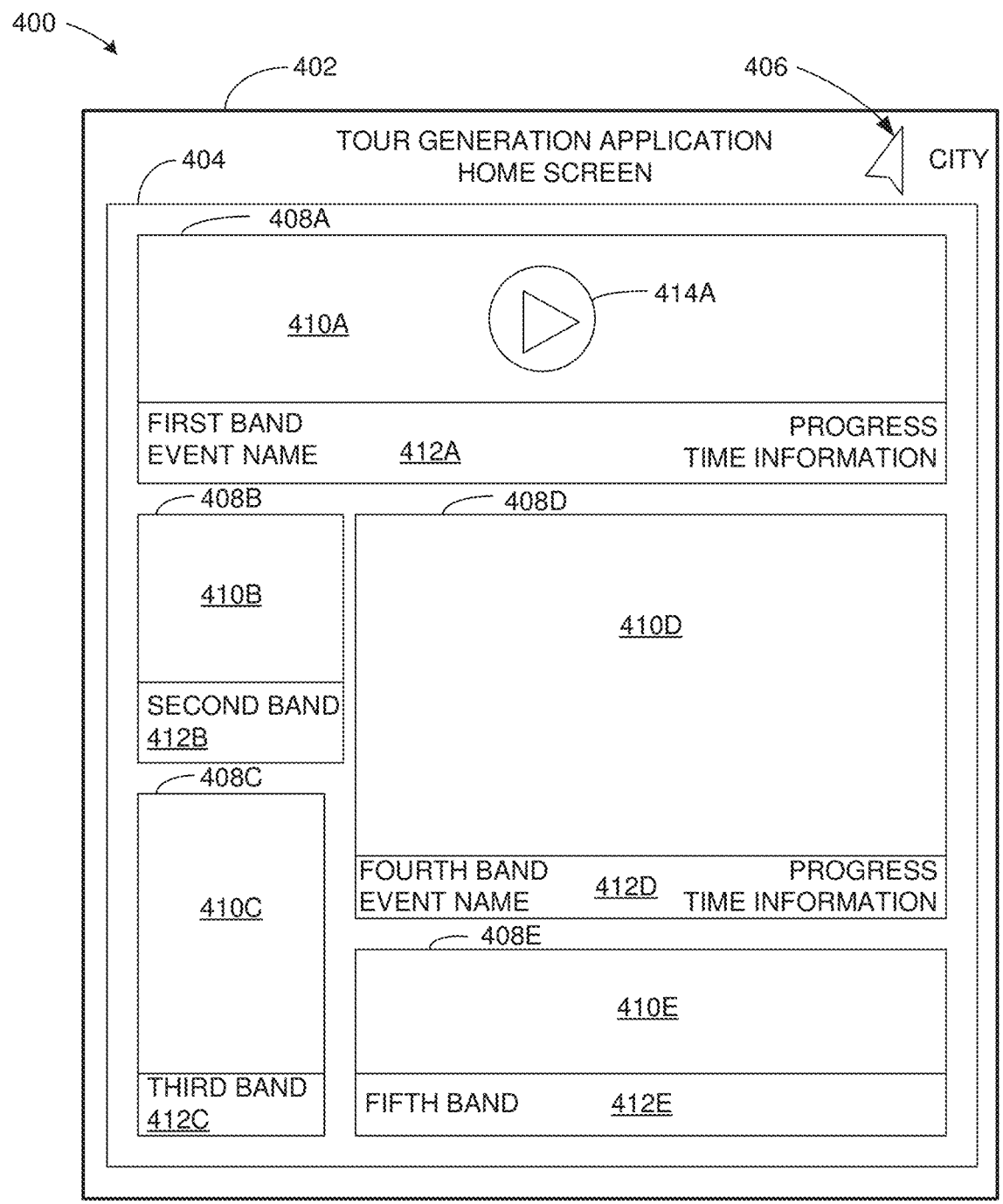
FIGS. 4A-4C are interface diagrams illustrating example user interfaces, according to example embodiments.
Figure 4B:
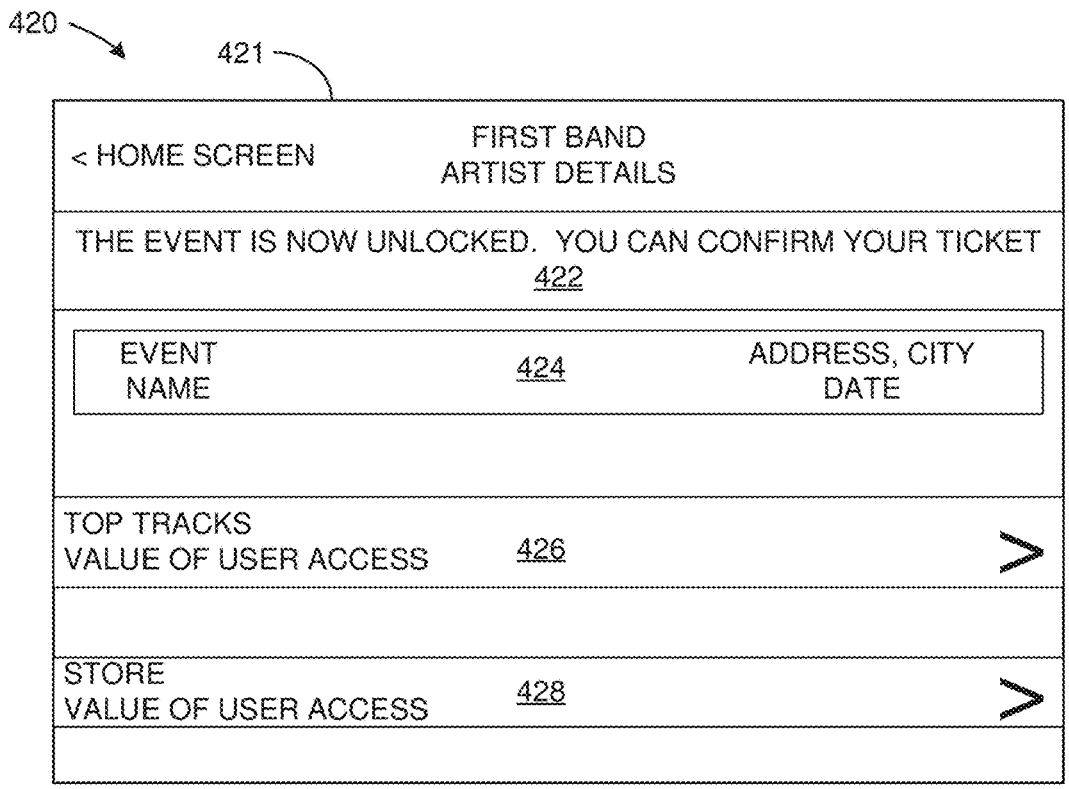
Figure 4C:
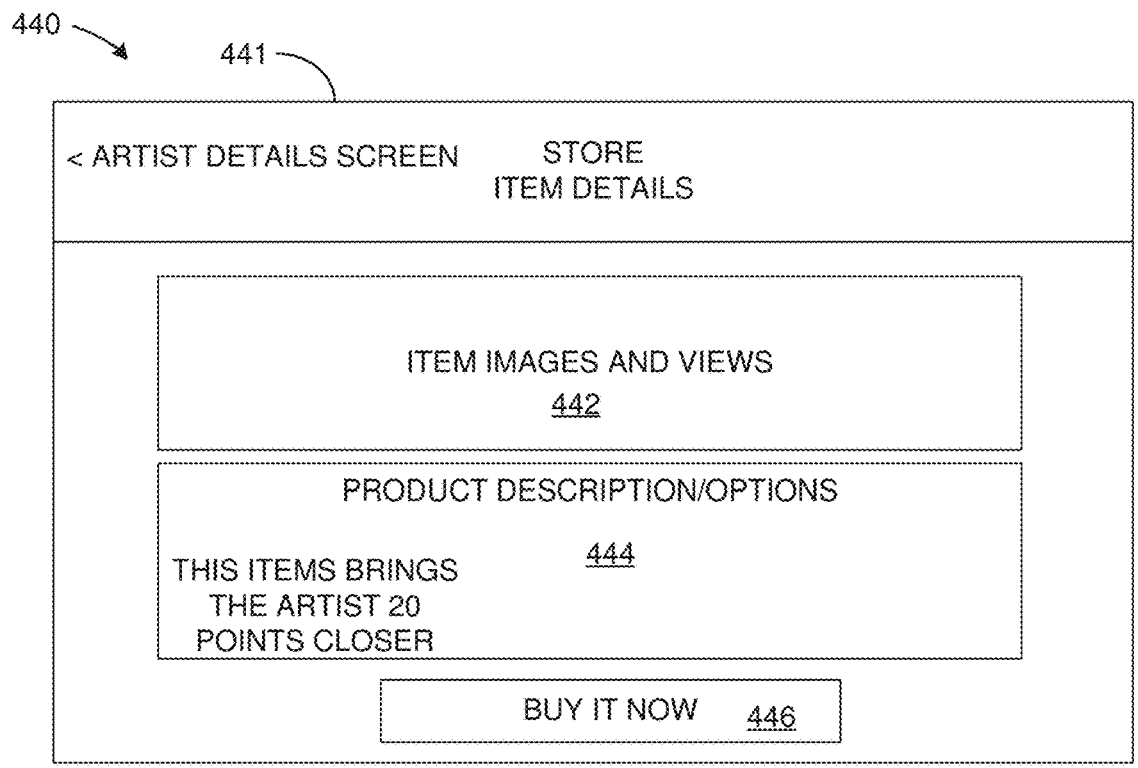

FIGS. 4A-4C are interface diagrams illustrating example user interfaces, according to example embodiments. FIG. 4A is an interface diagram illustrating an example home screen interface 400, according to example embodiments. The home screen interface 400 includes a frame element 402 having a sub-frame 404 and a location display element 406. The sub-frame element 404 includes one or more online marketplace elements 408A-408E. Each online marketplace element 408A-408E includes a graphic display element 410A-410E and information display elements 412A-412E. In this example, the home screen interface 400 may correspond to a graphical user interface displayed on a client device, such as the user device 110 of FIG. 1. In one embodiment, the online marketplace interface module 302 may provide the home screen interface 400 to the user device 110. The user device 110 may receive user input and provide the user input to the home screen interface 400, which may, in turn, be communicated to the modules 302-312 of the tour generator system 300.

The home screen interface 400 may serve as an interface to facilitate browsing, searching, and monitoring one or more online marketplaces. For example, in the illustrated example embodiment of FIG. 4A, the home screen interface 400 displays the online marketplace elements 408A-408E of five bands. Each of the graphic display elements 410A-410E may display images or graphics related to each of the online marketplaces. Furthermore, the information display elements 412A-412E may provide information regarding the online marketplace, such as a name (e.g., band name).

If one of the online marketplace elements 408A-408E is associated with an active or on-going campaign, the corresponding information display element 412A-412E may be configured to display information regarding the campaign.

For example, the information display elements 412A-412E may be figured to display name of the event (e.g., a tour name), current state of progress of the campaign (e.g., in terms of the remaining points to unlock a tour location related to a locale of the user (e.g., the locale being indicated by the location display element 406), the time remaining in the campaign, and the like.

In some embodiments, the online marketplace elements 408A-408E may be configured to provide a video that can be selectively played back for the user. For example, the online marketplace element 408A may include a playback button 414A for playing a video, such as a promotional video of the corresponding artist or a corresponding active campaign. For instance, the video can provide users information related to the campaign, such as an explanation of the reward or event to be unlocked, how scores may be determined, and the like parameters of the campaign.

In operation, the user may select one of the online marketplace elements 408A-408E to navigate to a view detail interface of the corresponding band, as will be described in greater detail in connection with FIG. 4B.

FIG. 4B is an interface diagram illustrating an example view detail interface 420, according to example embodiments. The view detail interface 420 includes a frame element 421 having a message sub-frame 422, an event sub-frame 424, a content sub-frame 426, and a store sub-frame 428. In this example, the view detail interface 420 may correspond to a graphical user interface displayed on a client device, such as the user device 110 of FIG. 1. The view detail interface 420 may serve as a homepage to an artist's page providing artist-related information, content, and merchandise. In one embodiment, the online marketplace interface module 302 may provide the view detail interface 420 to the user device 110. The user device 110 may receive user input and provide the user input to the view detail interface 420, which may, in turn, be communicated to the modules 302-312 of the tour generator system 300.

The illustrated embodiment of FIG. 4B shows that the frame element 421 includes text indicating the name of the artist of the online marketplace, such as "First Band." The frame element 421 also includes the message sub-frame 422, such as a text box element. The message sub-frame 422 may be configured to provide messages about the artist to the viewers of the view detail interface 420. In the illustrated embodiment, the message sub-frame 422 displays the message "The event is now unlocked. You can confirm your ticket." This message indicates to the current viewer of the view detail interface 420 that the event of the campaign has been unlocked by, for example, exceeding a predetermined threshold score. However, different users may not see this message. For example, users of a city corresponding to a locked location may receive a different message, e.g., such as, "Keep earning points to unlock a tour location for your city and to earn other rewards."

The content sub-frame 426 of the frame element 421 may be a user interface element which may be configured to provide, for display, information concerning and access to media content of the artist. For example, the content sub-frame 426 may display a listing of a selection of the artist's media content library, such as the three most accessed songs of the artist. As such, the content sub-frame 426 may be a configured to rank a media-content library of the artist based on various criteria, such as popularity, published date, and the like. To display a listing of a plurality of media content using reduced display area, the content sub-frame 426 may include a scrollable list of media content which may be selected by the user. When a listing of the content media is selected, the view detail interface 420 may be configured to provide the user the selected media content. Furthermore, the content sub-frame 426 may include a selectable region configured to navigate the user interface to a media library user interface (not shown) for display a more complete listing of the media content of the artist.

Additionally or alternatively, if there is an active campaign, the content sub-frame 426 may be configured to display information regarding the potential values or points that will be awarded for accessing to the media content. In this way, users may be incentivized to stream, download, purchase, and/or promote media content of the artist.

The store sub-frame 428 of the frame element 421 may be a user interface element which may be configured to display information and provide access to items of the corresponding online marketplace. For example, the store sub-frame 428 may display a listing of a selection of the artist's store library, such as the most-purchased merchandise of the artist. As such, the store sub-frame 428 may be configured to rank a library of store items of the artist based on various criteria, such as by popularity, date, price, and the like. To efficiently display a listing of a plurality of store items, the store sub-frame 420 may include a scrollable list of store items which may be selected by the user. When an item of the listing of the content media is selected, the view detail interface 420 may be configured to provide the user a view item interface, as will be described later in greater detail in connection with FIG. 4C. Furthermore, the store sub-frame 428 may include a selectable region configured to navigate the user interface to a store library user interface (not shown) for display a more detailed listing of the store library of the artist.

Additionally or alternatively, if there is an active campaign, the store sub-frame 428 be configured to display information regarding the potential values assigned for accessing to the store items displayed by the store sub-frame 428. In this way, users may be incentivized to purchase and/or promote store items, such as merchandise, of the artist.

FIG. 4C is an interface diagram illustrating an example view item interface 440, according to example embodiments. The view item interface 440 includes a frame element 441 having an image view element 442, a description element 444, and a button 446. In this example, the view item interface 440 may correspond to a graphical user interface displayed on a client device, such as the user device 110 of FIG. 1. The view item interface 440 may serve as a graphical interface page of a particular item of the artist's online marketplace in order to provide users details of the particular item. In one embodiment, the online marketplace interface module 302 may provide the view item interface 440 to the user device 110. The view item interface 440 may be provided responsive to a user input received from the view detail interface 420. When the view item interface 440 is displayed, the user device 110 may receive user input and provide the user input to the view item interface 440, which may, in turn, be communicated to the modules 302-312 of the tour generator system 300.

Accordingly, the image view sub-frame 442 of the frame element 441 may be a user interface element which may be configured to display one or more images of the store item. For example, the image view element 442 may display one or more images of a shirt for sale. The description sub-frame 444 of the frame element 441 may be a user interface element which may be configured to provide textual description of the store item. Additionally or alternatively, if there is an active campaign, the description sub-frame 444 may provide details regarding the points associated with accessing the store item. The button 446 of the frame element 441 may be a user interface element which may be configured to initiate a sales transaction responsive to being selected by the user.

It will be understood by a person of ordinary skill that other embodiments of the user interfaces 400, 420, 440 may include more or less elements that were shown in FIGS. 4A, 4B, and 4C.

Example Data Structure

Figure 5:
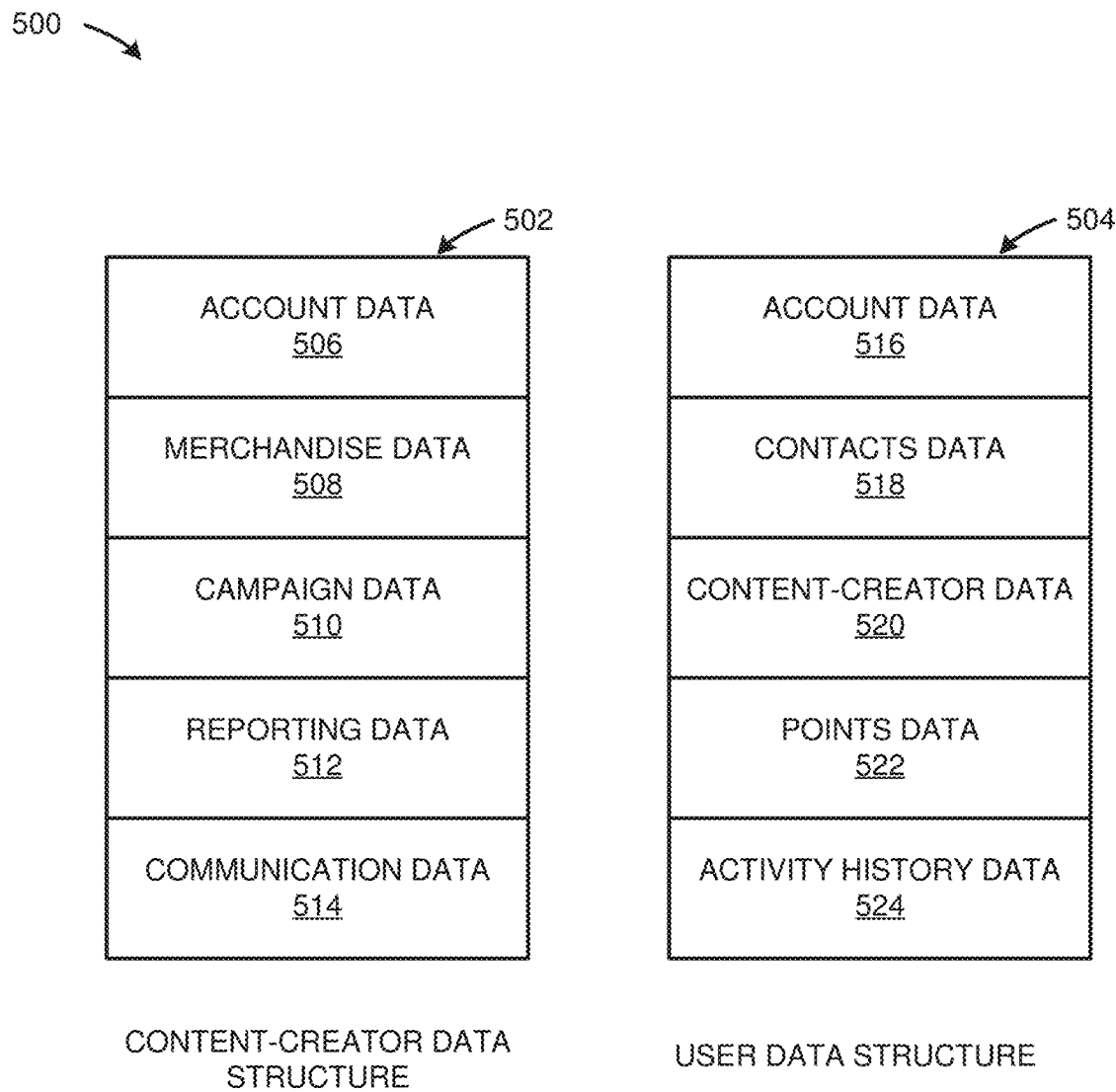
FIG. 5 is a block diagram illustrating example data structures including data fields for determining tour locations, in accordance with an example embodiment.

FIG. 5 is a block diagram illustrating example data structures 502, 504 including data fields for determining tour locations, in accordance with an example embodiment. The data structures 502, 504 may be stored in a database 126 communicatively coupled to the network-based online marketplace 102. Alternatively, one or more of the elements of the data structures 502, 504 may be included by any of the servers or client devices of FIG. 1.

The illustrated data structure 502 of FIG. 5 may serve as a data structure for storing, organizing, and providing data related to a particular artist or content creator. The data structure 502 includes an account data field 506, a merchandise data field 508, a campaign data field 510, a reporting data field 512, a communication data field 514, and the like data for facilitating an online marketplace and for facilitating campaigns for determining tour location. The account data field 506 can correspond to personal information, account settings, user identification, screen name, bank account information, and the like. The merchandise data field 508 can correspond to a catalog of store items. Store items can include physical goods, services, digital content, and/or tickets to events.

The campaign data field 510 of the data structure 502 can correspond to start and end dates, reward data structures, campaign rules, geographic parameters, and/or the like data related to implementing campaigns. The campaign data field can include assignments of points for different types of user accesses. The reporting data field 512 may correspond to analytics and statistics related to popularity of the artist and/or media content of the artist. In one embodiment, the reporting data field 512 can include a ranking of artists, for example, in terms of popularity within one or more cities. Moreover, the reporting data field 512 can include a list of cities ordered in terms of the corresponding artist's popularity in the cities. In this way, the artist can receive analytics determined from user accesses in order, for example, to determine in which cities and/or demographics the artist is having success. Furthermore, the reporting data field 512 may facilitate providing rewards to fans outside of an announced campaign.

The communication data field 514 of the data structure 502 can correspond to data from managing communications between the artist and the fans by email, social network, etc. Communications may be direct communications that may be addressed to particular fans or groups of fans. Additionally or alternatively, communications may be broadcasted indirectly to fans by the artist by publishing the communications on the artist's view detail user interface (e.g., interface 420 of FIG. 4B).

The illustrated data structure 504 of FIG. 5 may serve as a data structure for storing, organizing, and providing data related to a particular user, such as a fan. The data structure 504 may include an account data field 516, a contacts data field 518, a content-creator data field 520, a points data field 522, a activity history data field 524, and the like data for facilitating viewing and access content of an online marketplace, and for facilitating participating and promoting campaigns for determining tour location.

The account data field 516 of the data structure 504 can correspond to personal information, account settings, user identification, screen name, bank account information, social network and/or social media account information, and the like. The contacts data field 518 of the data structure 504 can correspond to links one or more other users of the online marketplace. The content-creator data field 520 of the data structure 504 can correspond to content creators (e.g., those users having an online marketplace, such as an artist) whom the user is following, such as the user's "favorite" artists. The points data field 522 of the data structure 504 can correspond to the accumulated points that the user has contributed to one or more campaigns, as well as an ongoing count of points accumulated by the user for respective one or more artists. The ongoing count serves to determine a listing of an artist's most active fans. The activity history data field 524 of the data structure 504 can correspond to a purchase history of the user.

Example Process for Determining a Tour Location

Figure 6:
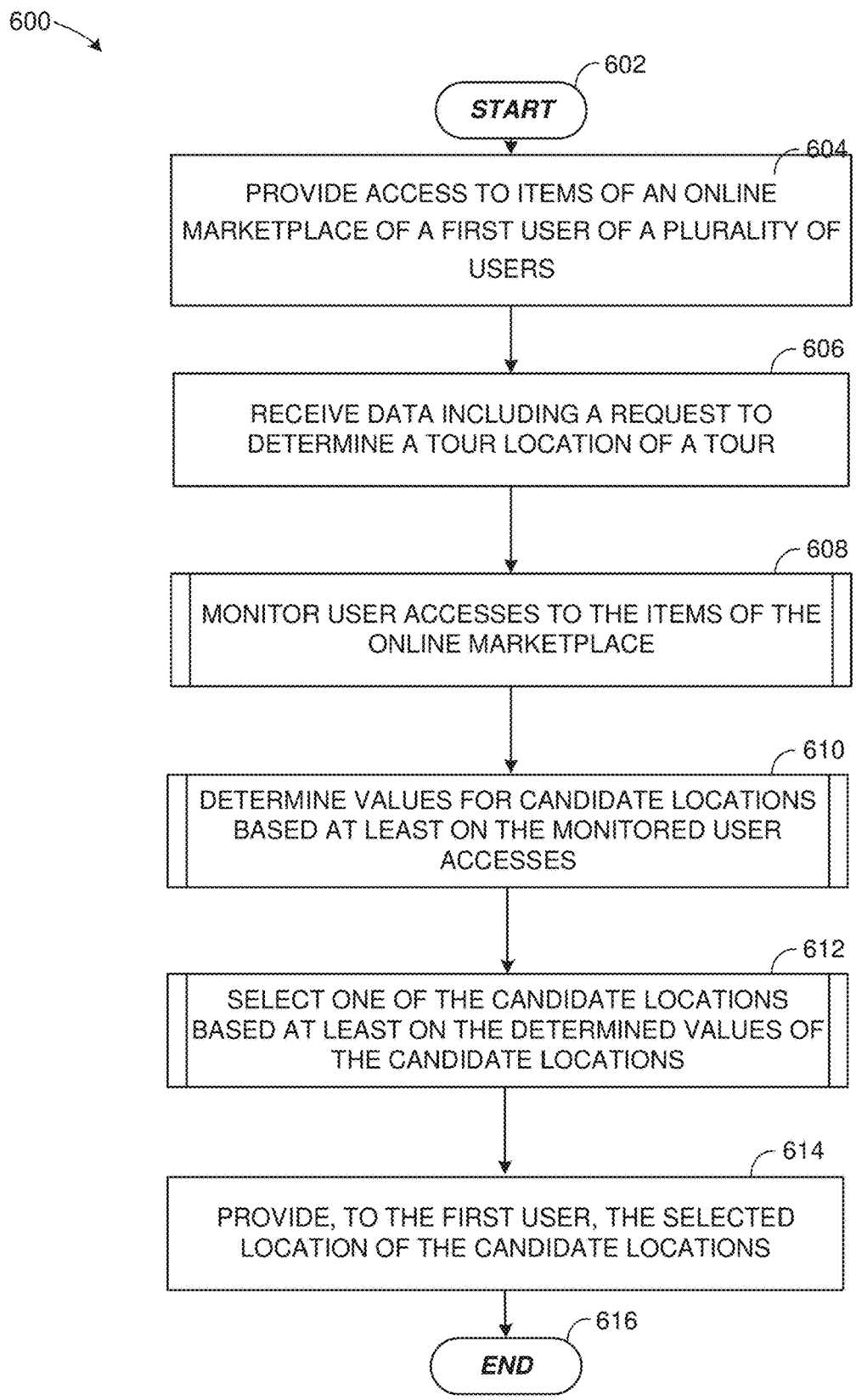
FIG. 6 is a flowchart illustrating a method for determining a tour location, in accordance with an example embodiment.

FIG. 6 is a flowchart illustrating a method 600 for determining a tour location, in accordance with an example embodiment. In this example, the method 600 may include operations such as providing access to items 604, receiving a request to determine a tour location 606, monitoring user accesses 608, determining values for candidate locations 610, selecting one of the candidate locations 612, and providing the selection 614. The example method 600 will be described, by way of explanation, below as being performed by certain modules. It will be appreciated, however, that the operations of the example method 600 can be performed in any suitable order by any number of the modules shown in FIG. 3.

At operation 602, the method 600 starts at block 602 and proceeds to block 604 for providing access to items of an online marketplace of a first user of a plurality of users. In one embodiment, the online marketplace interface module 302 may provide to the plurality of users data for a user interface of the online marketplace. In some embodiments, the online marketplace may provide a listing of a plurality of online marketplaces, such as, for example, the home screen interface 400 of FIG. 4A. Additionally or alternatively, the online marketplace may correspond to a marketplace dedicated to one artist or group. The online marketplace may be provided as a website or an application implemented on a client device of a user. Furthermore, users may be provided additional information and/or other user interfaces such as the view detail interface 420 of FIG. 4B and/or the view item interface 440 of FIG. 4C.

By interacting with these user interfaces, the users may provide input to their client devices in order to access items of the online marketplace. Users may be able to stream or download media content provided by the artist. The online marketplace may also provide access to merchandise for sale. Furthermore, users may be able to share or watch activities related to the online marketplace. For example, a user may be to share a link to the online marketplace to one or more contacts of the user, for example, via a social network system. In another example, the user may be able to subscribe or follow the online marketplace. A subscription provides the user automatic notifications in response to updates of the online marketplace.

At block 606, the method 600 may include receiving data that includes a request to determine a tour location of a tour. For example, the tour generator interface 306 of FIG. 3 may be configured to receive the data, either directly or indirectly, from a client device of the artist. The data may correspond to a request to initiate a process ("campaign") to determine one or more locations of a tour. As such, the data may include one or more parameters defining aspects of the tour that may be determined by the tour generator system 300. The parameters for various embodiments are described in greater detail above in connection with FIG. 3.

As previously stated, an artist may provide parameters defining geographic preferences and/or constraints, such as, but is not limited to, selection parameters, as will be described in greater detail below in connection with FIG. 10. In one embodiment, the artist may be able to restrict the candidate tour locations to be located within one or more geographical boundaries. The artist may also be able to provide the number of tour locations to be selected for each of the geographical boundaries. Another parameter may define how a location are to be selected to be considered a candidate locations, and how users are to be associated with the candidate locations. For example, the data provided by the artists may indicate to the tour generator system 300 that candidate tour locations should correspond to cities having a population greater than a predetermined threshold, and that the candidate tour locations and/or selected tour locations should be separated by distance of at least a predetermined threshold. Another parameter may define a threshold for selecting a candidate tour location based on a score determined for the candidate tour location. For example, in response to a score of a candidate tour location exceeding the threshold provided by the data, the tour generate system 300 can select the candidate tour location to be included as part of the tour.

As previously stated, the data received from the artist may additionally or alternatively include time preferences and/or constraints. In one embodiment, the artist may provide data indicative of the desired tour dates. The artist may also provide data indicative of a start and end time of the campaign to determine tour locations. In some embodiments, the artist may provide more or less data than what has been described, and omitted data may be supplied default values.

At block 608, the method 600 may include monitoring user accesses to the items of the online marketplace. Example of user accesses include streaming media content, downloading media content, purchasing merchandise, sharing the online marketplace with one or more contacts, subscribing to the online marketplace, and pre-ordering tickets for purchase subject to the user's location being selected. In one embodiment, the monitor module 308 of FIG. 3 may be configured to receive data indicative of user accesses from the market interface module 302. The data can be stored for later processing or can be transmitted to the location module 310 for contemporaneous processing. An example method of block 608 will be described in greater detail later in connection with FIG. 8.

At block 610, the method 600 may include determining values for candidate locations based at least on the monitored user accesses. The determined values can correspond to points as determined by a point system. In one embodiment, the location module 310 of FIG. 3 can receive data indicative of user accesses from the monitor module 308. Based on the type of user access, the location module 310 may assign points to the user access. The points of a plurality of user accesses may be combined or added to determine a score of a location, or to determine a score of a particular user. The location may correspond to a locale of the corresponding user. As stated, the locale can be matched to one of the candidate location based on one or more considerations, such as based on proximity or other consideration in accordance with rules or parameters, if any, provided by the artist. An example method of block 610 will be described in greater detail later in connection with FIG. 9

At block 612, the method 600 may include selecting one of the candidate locations based at least on the determined values of the candidate locations. In some embodiments, the selection may be responsive to an event or trigger. For example, the location selector module 310 of FIG. 3 may be configured to select a candidate location at the expiration of a duration of the campaign. The duration may be specified by the artist, for example, by providing start and end times. In another embodiment, the location selector module 310 may be configured to select a candidate location based on comparing the score location to a threshold value. If the candidate location has a score that exceeds the threshold value, the location selector module 310 may be configured to automatically select the location. The campaign, in such an embodiment, may conclude after a predetermined number of candidate locations have been selected. For example, the artist may specify that the campaign is to select up to ten locations for a tour. After the selection of the tenth candidate location, the tour generator system 300 may initiate ending the campaign. An example method of block 612 will be described in greater detail later in connection with FIG. 10.

At block 614, the method 600 may include providing an indication of the selected location of the candidate locations. In one embodiment, the tour generator system 300 may be configured to provide a notification to the artist that the candidate location has been selected. Additionally or alternatively, the online marketplace interface module 302 may provide a notification to users (e.g., by email or a broadcast notification on the view detail interface 420) that the location has been selected. Once the selected location has been provided, the method 600 may end at block 616.

Figure 7:
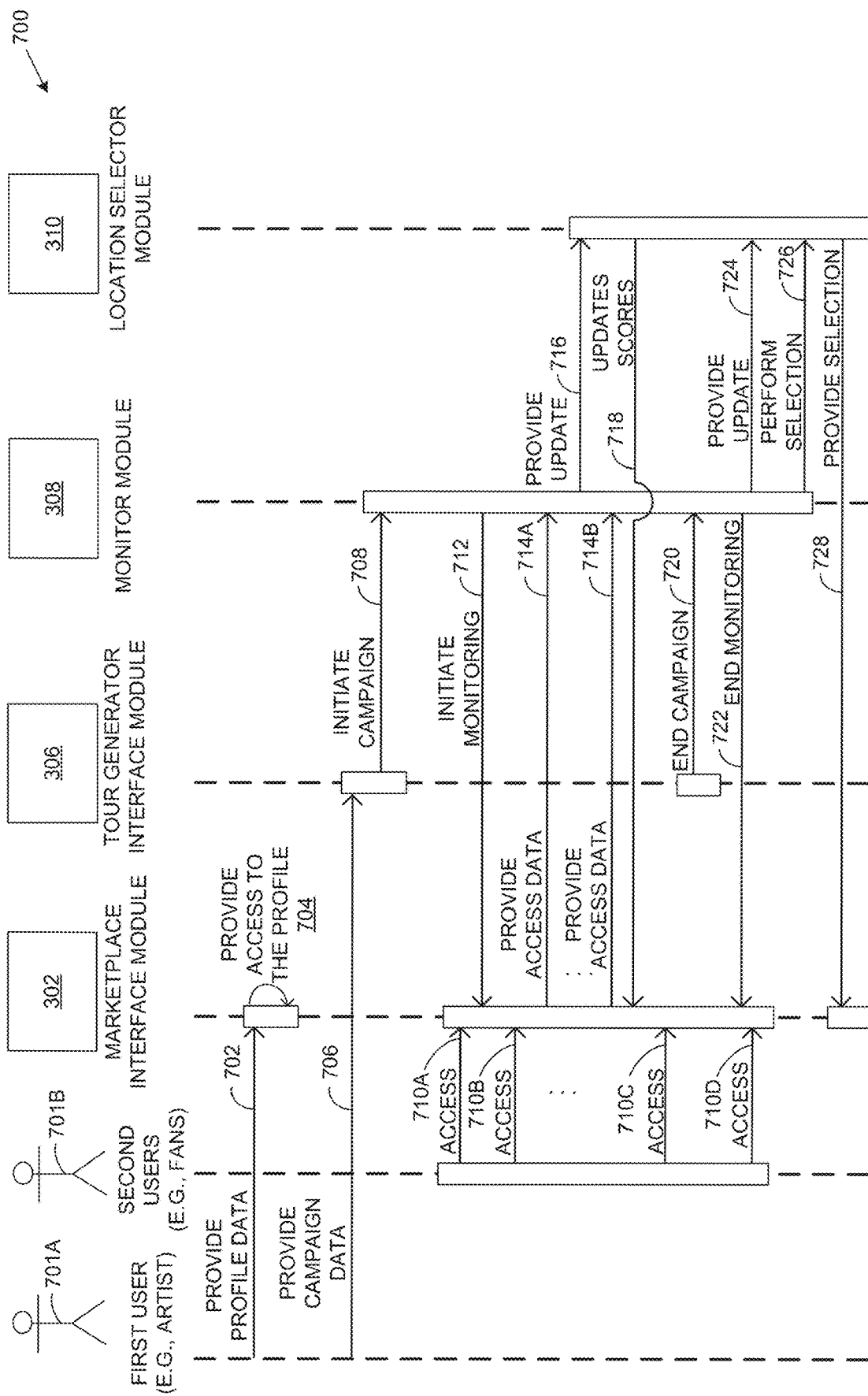
FIG. 7 is an interaction diagram illustrating a method of determining a tour location, in accordance with an example embodiment.

FIG. 7 is an interaction diagram illustrating a method 700 of determining a tour location, in accordance with an example embodiment. In particular, FIG. 7 illustrates interactions between users and components of the tour generator system 300 of FIG. 3.

At operation 702, a first user 701A may provide profile data to the online marketplace interface module 302. The profile data may be used by the marketplace interface module 302 to configure an online marketplace of the first user 701A. For example, the profile data may correspond to one or more of the data fields 506-514 of FIG. 5. At operation 704, the online marketplace interface module 302 may provide access to the profile. For example the first user or the second users 701A, 701B may access the online marketplace.

At operation 706, the first user may provide campaign data to the tour generator interface 306. As stated, the campaign data may include a request to initiate a tour, including data indicative of the start and end times, geographic preferences, rewards, and like. At operation 708, the tour generator interface 306 may initiate the campaign. For example, based on the campaign data received at operation 706, the tour generator interface 306 may signal to the monitor module 308 to initiate monitoring user accesses of the online marketplace interface module 302.

At operations 710A-710D, the second users 701B may access the profile provided by the online marketplace interface module 302. For example, the second users 701B may access items of the online marketplace of the first user by downloading media content, purchasing media content, sharing the online marketplace with one or more contacts of the second users, subscribing to the online marketplace, and/or pre-ordering a ticket.

At operation 712, the monitor module 308 may initiate monitoring of user access of the online marketplace. For example, in one embodiment, the monitor module 308 may signal to the marketplace interface module 302 to provide the monitor module 308 data indicative of the user accesses. In particular, the monitor module 308 may provide callback data that configures the marketplace interface module 302 to provide user access data to the monitor module 308 in response to the second users' 701B accessing items of the online marketplace.

At operations 714A-714B, the online marketplace interface module 302 may provide user access data to the monitor module 308. At operation 716, the monitor module 308 may provide an update to the location selector module 310. In some embodiments, operations 716 may be repeated a plurality of times. In an alternative embodiment, operation 716 may be omitted. Operation 716 may facilitate real-time tracking of scores.

At operation 718, the location selector module 310 may update scores of the candidate locations. For example, the location selector module 310 may provide the updated scores to the online marketplace interface module 302. The example method for determining scores for candidate locations will be described later in greater detail in connection with FIG. 9. By providing updates to the online marketplace interface module 302, the online marketplace may provide the first user and second users 701A, 701B notifications of the progress of the campaign. In one embodiment, the online marketplace interface module 302 may provide a leaderboard displaying a ranking of the highest scoring locations and or individual users.

At operation 720, the tour generator interface 306 may initiate termination of the campaign. As stated, the campaign may be terminated based on one or more types of events or triggers. To initiate the termination of the campaign, the tour generating interface module 306 may signal to the monitor module 308 that that campaign is to be terminated. In turn, at operation 722, the monitor module 308 may signal to the online marketplace interface module 302 to end monitoring. For example, the signal may indicate to the tour generator interface 306 that the tour generating interface module 306 should stop providing user access data to the monitor module 308.

At operation 724, the monitor module 308 may provide an update of the access data to the location selector module 310. For example, the monitor module 308 may buffer user access data and provide the user access data in batches to the location selector module 310. Accordingly, providing an update at operation 724 may provide the location selector module 310 with the remaining buffered user access data.

At operation 726, the monitor module 308 may signal to the location selector module 310 to perform the selection of one or more candidate locations. An example of a method for selecting a candidate location will be described in greater detail later in connection with FIG. 10. At operation 728, the location selector module 310 may provide the results of the selection to the online marketplace interface module 302 for notifying the first and second users 701A, 701B.

Figure 8:
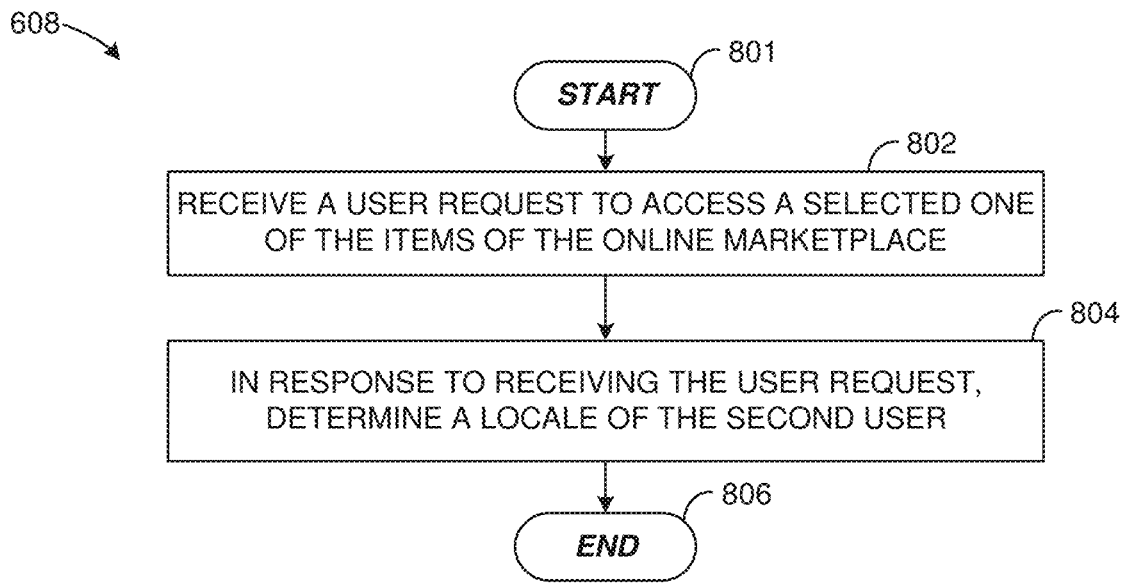
FIG. 8 is a flowchart illustrating a method for monitoring user accesses to items of an online market, in accordance with an example embodiment.

FIG. 8 is a flowchart illustrating a method 608 for monitoring user accesses to items of an online market, in accordance with an example embodiment. In this example, the method 608 may include operations such as receiving a user request 802 and determining a locale of the second user 804. The example method 608 will be described, by way of explanation, below as being performed by certain modules. It will be appreciated, however, that the operations of the example method 608 can be performed in any suitable order by any number of the modules shown in FIG. 3. Moreover, more or less operations may be included by the example method 608.

The method 608 starts at block 801 and proceeds to block 802 for receiving a user request to access a selected one of the items of the online marketplace. In one embodiment, the monitor module 308 may be configured to receive data from the online marketplace interface module 302. At block 804, the method 608 may include determining a locale of the second user. For example, the monitor module 308 may determine the locale based on location information included in the access data. Alternatively, the monitor module 308 may request locale data of the corresponding user by querying the online marketplace interface module 302. For example, the online marketplace interface module 302 may access account data (e.g., account data 516 of data structure 504 of FIG. 5) associated with the corresponding user. In some embodiments, the monitor module 308 may store data indicative of the user access and of the locale for later retrieval. Alternatively, the monitor module 308 may immediately provide the data to the location selector module 310. At block 806, the method 608 may end.

Figure 9:
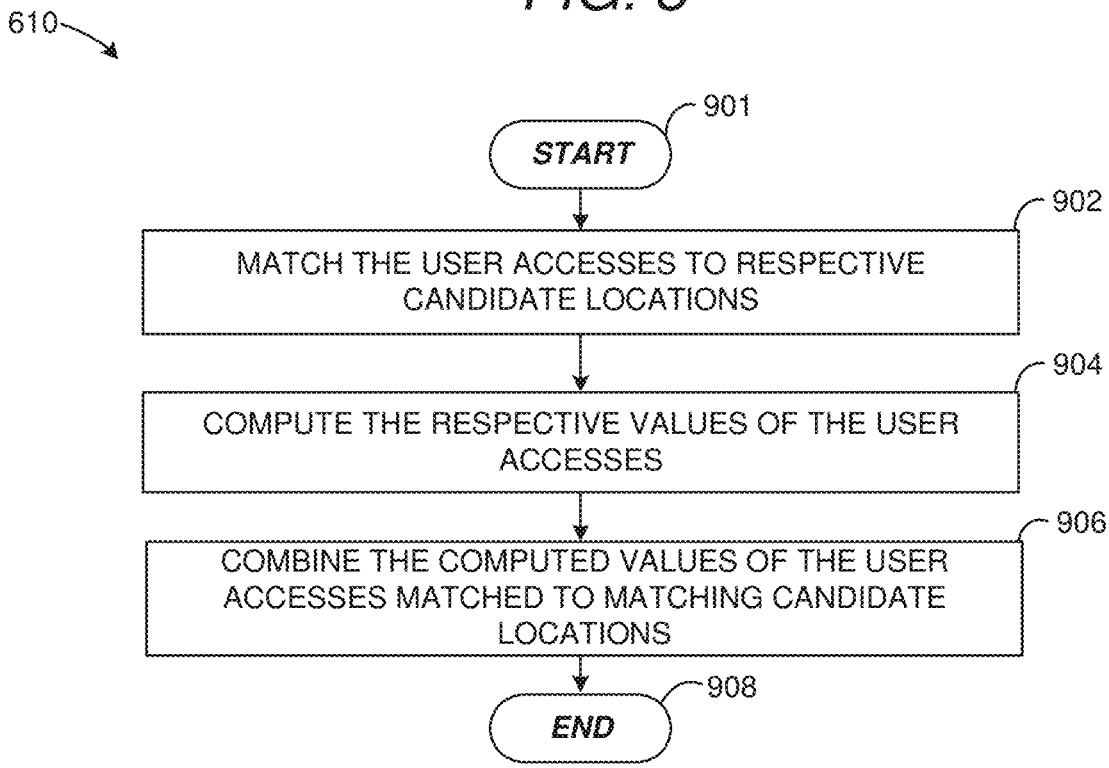
FIG. 9 is a flowchart illustrating a method for determining values for candidate locations, in accordance with an example embodiment.

FIG. 9 is a flowchart illustrating a method 610 for determining values for candidate locations, in accordance with an example embodiment. In this example, the method 610 may include operations such as matching the user accesses to locations 902, computing the values of the user accesses 904, and combining the computed values 906. The example method 610 will be described, by way of explanation, below as being performed by certain modules. It will be appreciated, however, that the operations of the example method 610 can be performed in any suitable order by any number of the modules shown in FIG. 3.

The method 610 can start at block 901 and proceeds to block 902 for matching the user accesses to respective candidate locations. In one embodiment, the location selector module 310 may match a particular user access to a candidate location based on a locale determined during the monitoring of the user access (e.g., block 804 of method 608 of FIG. 8). Candidate locations may be determined based on user input (e.g., campaign data provided by the artist). In the alternative embodiments, candidate locations can be determined dynamically by automatically identifying candidate locations by matching a locale of the user to a nearby city. For example, the location selector module 310 may be configured to identify, based on the locale of the user access, the nearest city that has at least a threshold population.

At block 904, the method 610 may include computing the respective values of the user accesses. For example, the location selector module 310 may assign points to a particular user access based on a scoring system determined based on the campaign data received from the artist as input. Alternatively, the scoring system may be determined based on default values. At block 906, the method 610 may include combining the computed values of the user's accesses matched to the matching candidate locations. At block 908, the method 610 may end.

Figure 10:
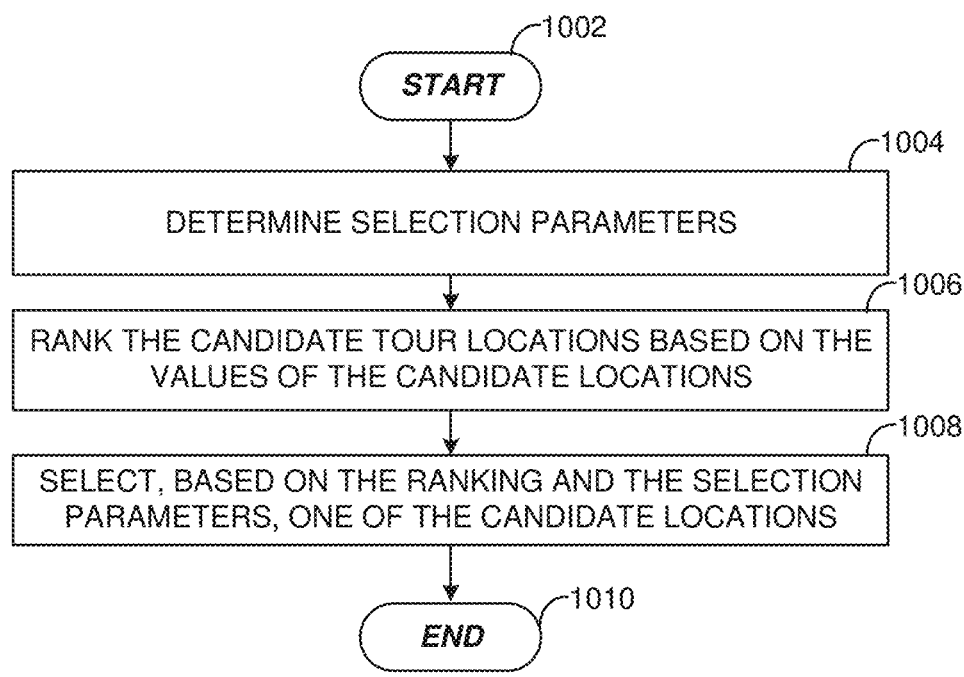
FIG. 10 is a flowchart illustrating a method for selecting one location of the candidate locations, in accordance with an example embodiment.

FIG. 10 is a flowchart illustrating a method 612 for selecting one location of the candidate locations, in accordance with an example embodiment. In the illustrated example embodiment, the method 612 may include operations such as determining selection parameters 1004, ranking the candidate tour locations 1006, and selecting one of the candidate locations 1008. The example method 612 will be described, by way of explanation, below as being performed by certain modules. It will be appreciated, however, that the operations of the example method 612 can be performed in any suitable order by any number of the modules shown in FIG. 3.

The method 612 may start at block 1002 and may proceed to block 1004 for determining selection parameters. The selection parameters may include the number of candidate locations be selected, the duration of the campaign, a threshold score for selecting a candidate location, regional preferences or constraints, and/or the like. The selection parameters may be determined from data received from the artist.

At block 1006, the method 612 may include a ranking the candidate tour locations based on the values of the candidate locations. The candidate tour locations may be provided scores as described in greater detail in connection with method 610 of FIG. 9. At block 1008, the method 612 may include selecting one of the candidate locations. For example, the selection may be based on the selection parameters determined at block 1004 as well as the ranking performed at block 1006. For example, the selection parameters may indicate that the top five cities are to be selected based on the scores. Accordingly, the location selector module 310 may select the top five cities of the ranking determined at block 1006. The selected cities may be included in the tour. The method 612 may end at block 1010.

Example Mobile Device

Figure 11:
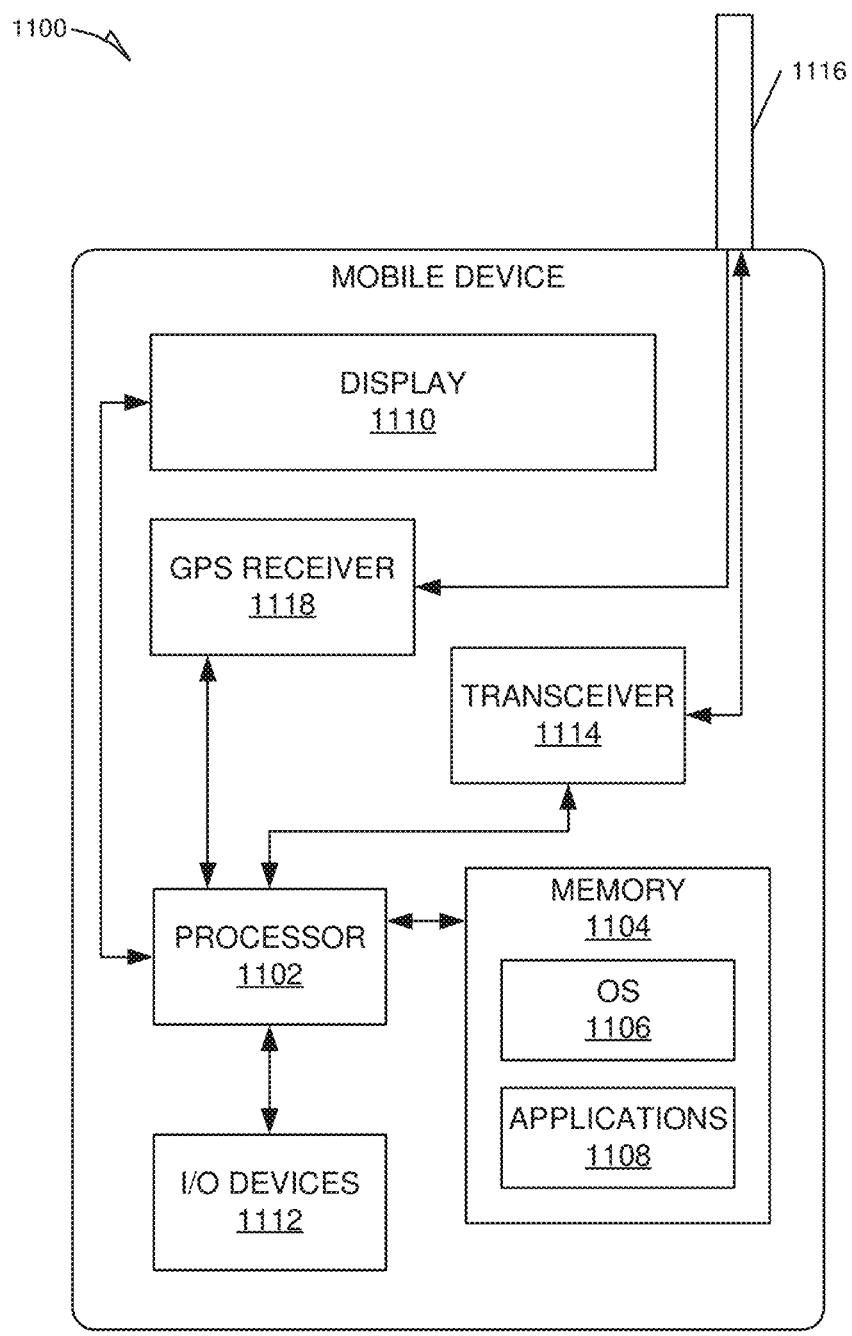
FIG. 11 is a block diagram illustrating a mobile device, according to an example embodiment.

FIG. 11 is a block diagram illustrating a mobile device 1100, according to an example embodiment. The mobile device 1100 may include a processor 1102. The processor 1102 may be any of a variety of different types of commercially available processors suitable for mobile devices (for example, an XScale architecture microprocessor, a Microprocessor without Interlocked Pipeline Stages (MIPS) architecture processor, or another type of processor). A memory 1104, such as a random access memory (RAM), a Flash memory, or other type of memory, is typically accessible to the processor. The memory 1104 may be adapted to store an operating system (OS) 1106, as well as application programs 1108, such as a mobile location enabled application that may provide Location Based Services (LBSs) to a user. The processor 1102 may be coupled, either directly or via appropriate intermediary hardware, to a display 1110 and to one or more input/output (I/O) devices 1112, such as a keypad, a touch panel sensor, a microphone, and the like. Similarly, in some embodiments, the processor 1102 may be coupled to a transceiver 1114 that interfaces with an antenna 1116. The transceiver 1114 may be configured to both transmit and receive cellular network signals, wireless data signals, or other types of signals via the antenna 1116, depending on the nature of the mobile device 1100. Further, in some configurations, a GPS receiver 1118 may also make use of the antenna 1116 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
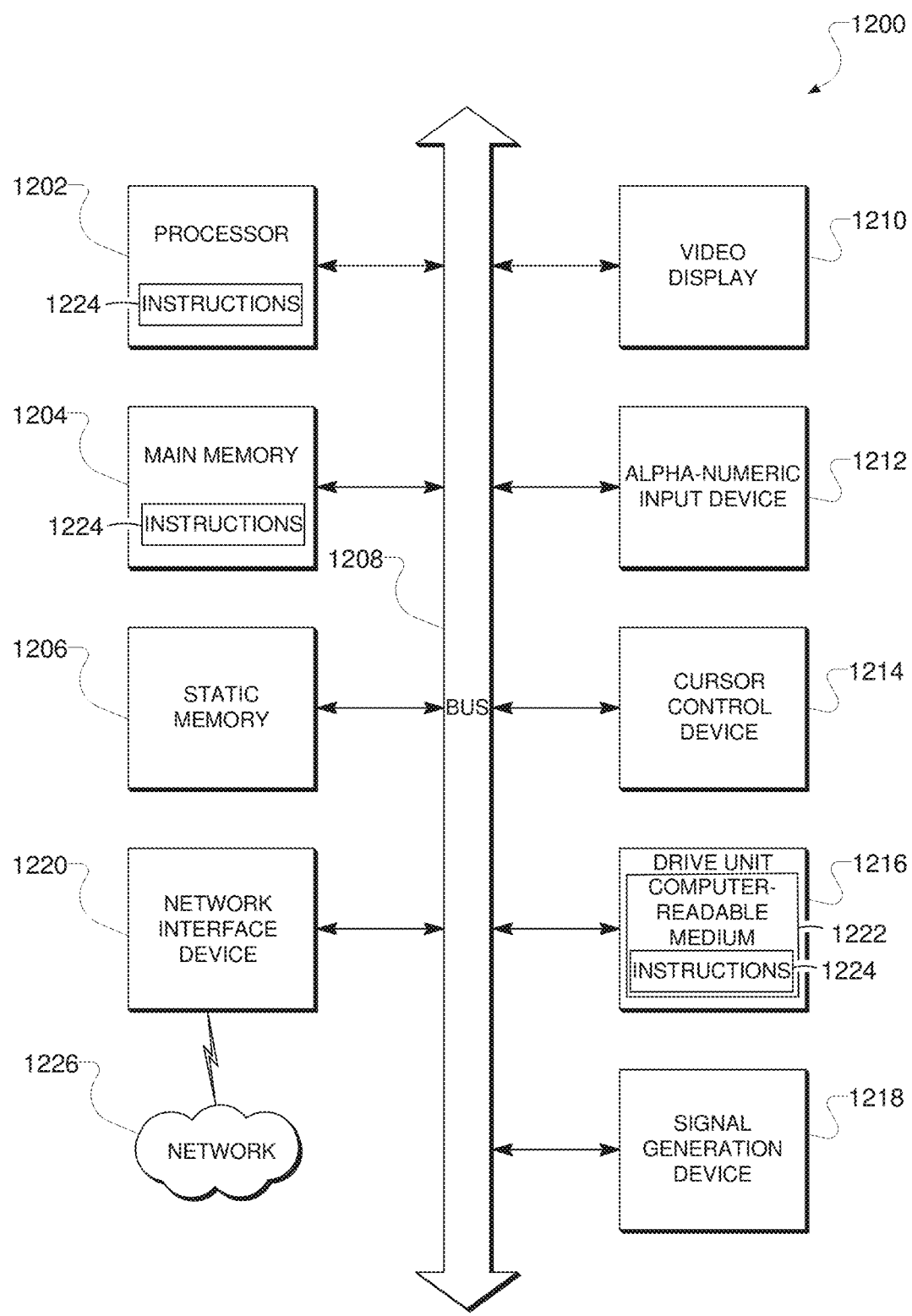
FIG. 12 is a block diagram of machine in the example form of a computer system within which instructions, for causing the machine to perform any one or more of the methodologies discussed herein, may be executed.

FIG. 12 is a block diagram of machine in the example form of a computer system 1200 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard or a touch-sensitive display screen), a user interface (UI) navigation device 1214 (e.g., a mouse), a disk drive unit 1216, a signal generation device 1218 (e.g., a speaker) and a network interface device 1220.

Machine-Readable Medium

The disk drive unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any non-transitory, tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed:

1. A system comprising:
   one or more processors and executable instructions accessible on a computer-readable medium that, when executed, cause the one or more processor to perform operations comprising:
   receiving, by a tour generator interface, campaign data that includes a request to initiate a tour and a maximum number of selected cities for one or more sub-region, each of a plurality of candidate cities being included in a sub-region of a plurality of sub-regions;
   in response to receiving the campaign data, providing a signal from the tour generator interface to a monitoring module to initiate monitoring of electronic interactions of a plurality of users with an online marketplace, the electronic interactions relating to accessing content of an artist on the online marketplace;
   monitoring, by the monitoring module, the electronic interactions, the monitoring comprising receiving, by the monitoring module, user data indicating the electronic interactions from a marketplace interface module;
   determining values for candidate cities based at least on the monitoring of the electronic interactions and locales of the plurality of users performing the electronic interactions;
   selecting a candidate city from the candidate cities for unlocking of a tour stop, the selecting being based on the determined values of the candidate cities, a threshold score for candidate cities to be selected as a tour stop, and the maximum number of selected cities in a first sub-region of the plurality of sub-regions;
   detecting, by the monitoring module from the user data associated with a first user and a second user, a location associated with the first user and the second user;
   based on the location of the first user being associated with the selected candidate city, causing display of a first interactive user interface that includes a message indicating that the tour stop at the selected candidate city is unlocked; and
   based on the location of the second user being associated with an unselected candidate city, causing display of a second interactive user interface that includes a message indicating that a tour stop at the unselected candidate city remains locked.

2. The system of claim 1, wherein the operations further comprise deriving the locales of the plurality of users from the user data received from devices of the plurality of users, the user data including geographic parameters pertaining to the plurality of users.

3. The system of claim 1, wherein the operations further comprise providing, to the plurality of users, rankings of at least one of the candidate cities, the respective rankings being based on the respective values determined from the electronic interactions.

4. The system of claim 1, wherein the electronic interactions include at least one of streaming media content, downloading media content, or sharing the online marketplace with one or more contacts.

5. The system of claim 1, wherein the operations further comprise, responsive to receiving of the user data pertaining to the electronic interactions, providing notifications to one or more users of the plurality of users, the notifications providing an indication that a tour generation process has been initiated.

6. The system of claim 1, wherein the determining the values of the candidate cities comprises:
   matching the electronic interactions to respective candidate cities;
   computing respective values of the electronic interactions; and
   combining the computed values of the electronic interactions, the computed values being matched to corresponding candidate cities.

7. The system of claim 1, wherein the selecting the candidate city further comprises:
   determining selection parameters based on the user data received from a plurality of client devices of the plurality of users; and
   ranking the candidate cities based on the determined values of the candidate cities, the selecting of the candidate city being based on the ranking of the one or more of the candidate cities and the determined selection parameters.

8. The system of claim 1, wherein the operations further comprise providing a reward to at least a selected user of the plurality of users based on the values determined from the electronic interactions.

9. The system of claim 1, wherein the user data received from the plurality of users includes a specified number of tickets being reserved.

10. A method comprising:
receiving, by a tour generator interface, campaign data that includes a request to initiate a tour and a maximum number of selected cities for one or more sub-regions, each of a plurality of candidate cities being included in a sub-region of a plurality of sub-regions;
in response to receiving the campaign data, providing a signal from the tour generator interface to a monitoring module to initiate monitoring of electronic interactions of a plurality of users with an online marketplace, the electronic interactions relating to accessing content of an artist on the online marketplace;
monitoring, by the monitoring module, the electronic interactions, the monitoring comprising receiving, by the monitoring module, user data indicating the electronic interactions from a marketplace interface module;
determining values for candidate cities based at least on the monitoring of the electronic interactions and locales of the plurality of users performing the electronic interactions;
selecting a candidate city from the candidate cities for unlocking of a tour stop, the selecting being based on the determined values of the candidate cities, a threshold score for candidate cities to be selected as a tour stop, and the maximum number of selected cities in a first sub-region of the plurality of sub-regions;
detecting, by the monitoring module from the user data associated with a first user and a second user, a location associated with the first user and the second user;
based on the location of the first user being associated with the selected candidate city, causing display of a first interactive user interface that includes a message indicating that the tour stop at the selected candidate city is unlocked; and
based on the location of the second user being associated with an unselected candidate city, causing display of a second interactive user interface that includes a message indicating that a tour stop at the unselected candidate city remains locked.

11. The method of claim 10, further comprising deriving the locales of the plurality of users from the user data received from devices of the plurality of users, the user data including geographic parameters pertaining to the plurality of users.

12. The method of claim 10, further comprising providing, to the plurality of users, rankings of at least one of the candidate cities based on the values determined from the electronic interactions.

13. The method of claim 10, wherein the determining the values of the candidate cities comprises:
matching the electronic interactions to respective candidate cities;
computing respective values of the electronic interactions; and
combining the computed values of the electronic interactions, the computed values being matched to corresponding candidate cities.

14. A machine-readable storage medium having no transitory signals and embodying instructions that, when executed by a machine, cause the machine to perform operations comprising:
receiving, by a tour generator interface, campaign data that includes a request to initiate a tour and a maximum number of selected cities for one or more sub-regions, each of a plurality of candidate cities being included in a sub-region of a plurality of sub-regions;
in response to receiving the campaign data, providing a signal from the tour generator interface to a monitoring module to initiate monitoring of electronic interactions of a plurality of users with an online marketplace, the electronic interactions relating to accessing content of an artist on the online marketplace;
monitoring, by the monitoring module, the electronic interactions, the monitoring comprising receiving, by the monitoring module, user data indicating the electronic interactions from a marketplace interface module;
determining values for candidate cities based at least on the monitoring of the electronic interactions and locales of the plurality of users performing the electronic interactions;
selecting a candidate city from the candidate cities for unlocking of a tour stop, the selecting being based on the determined values of the candidate cities, a threshold score for candidate cities to be selected as a tour stop, and the maximum number of selected cities in a first sub-region of the plurality of sub-regions;
detecting, by the monitoring module from the access data associated with a first user and a second user, a location associated with the first user and the second user;
based on the location of the first user being associated with the selected candidate city, causing display of a first interactive user interface that includes a message indicating that the tour stop at the selected candidate city is unlocked; and
based on the location of the second user being associated with an unselected candidate city, causing display of a second interactive user interface that includes a message indicating that a tour stop at the unselected candidate city remains locked.

15. The machine-readable storage medium of claim 14, wherein the operations further comprise deriving the locales of the plurality of users from the user data received from devices of the plurality of users, the user data including geographic parameters pertaining to the plurality of users.

\* \* \* \* \*